(12) United States Patent
Raj et al.

(10) Patent No.: US 11,761,901 B2
(45) Date of Patent: *Sep. 19, 2023

(54) APPARATUS AND METHOD FOR INSPECTING LAMPS

(71) Applicant: Applied Materials, Inc., Santa Clara, CA (US)

(72) Inventors: Govinda Raj, Santa Clara, CA (US); Vilen K. Nestorov, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,791

(22) Filed: Sep. 19, 2022

(65) Prior Publication Data

US 2023/0017365 A1  Jan. 19, 2023

Related U.S. Application Data

(63) Continuation of application No. 17/200,112, filed on Mar. 12, 2021, now Pat. No. 11,460,413.

(Continued)

(51) Int. Cl.
*G01N 21/88* (2006.01)
*G01N 21/66* (2006.01)
(Continued)

(52) U.S. Cl.
CPC ......... *G01N 21/8851* (2013.01); *G01N 21/66* (2013.01); *F21V 29/10* (2015.01); *G01B 11/02* (2013.01)

(58) Field of Classification Search
CPC ...... G01B 11/022; G01B 11/02; G01N 21/95; G01N 21/66; G01N 21/8851; F21V 29/10
See application file for complete search history.

(56) References Cited

U.S. PATENT DOCUMENTS 4,291,444 A    9/1981  McCarty et al.
4,918,354 A *  4/1990  Johnson, Jr. ............. H01K 1/14
                                                        313/344

(Continued)

FOREIGN PATENT DOCUMENTS

CN    109521029 A    3/2019
JP    2002513927 A   5/2002

(Continued)

OTHER PUBLICATIONS

Isamu et al "Manufacturing Method of Filament and Incandescent Lamp", Apr. 23, 2014, JP 2015 207 516A. (Year: 2014).*

(Continued)

*Primary Examiner* — Sang H Nguyen
(74) *Attorney, Agent, or Firm* — Patterson + Sheridan, LLP

(57) ABSTRACT

Examples disclosed herein relate to a method and apparatus for inspecting lamp dimensions. The method includes determining an actual measurement of a lamp. The lamp is configured to heat a substrate in a substrate processing apparatus. A window is generated, the window having a width and a height. The window is based upon a target measurement of the lamp. The method further includes generating a deviation based upon a difference between an image of the actual measurement and the window. The deviation is compared to a first threshold. The lamp is rejected if the deviation is outside the first threshold.

30 Claims, 13 Drawing Sheets

Related U.S. Application Data

(60) Provisional application No. 62/989,451, filed on Mar. 13, 2020.

(51) Int. Cl.
*F21V 29/10* (2015.01)
*G01B 11/02* (2006.01)

(56) References Cited

U.S. PATENT DOCUMENTS

| | | |
|---|---|---|
| 6,048,082 A | 4/2000 | Washimoto |
| 6,099,148 A | 8/2000 | Northrup et al. |
| 6,661,030 B2 | 12/2003 | Komoto et al. |
| 7,612,491 B2 | 11/2009 | Ranish et al. |
| 8,106,591 B2 | 1/2012 | Serebryanov et al. |
| 8,314,368 B2 | 11/2012 | Ranish et al. |
| RE44,712 E | 1/2014 | Ranish et al. |
| 2001/0010308 A1 | 8/2001 | Hauf et al. |
| 2002/0105638 A1 | 8/2002 | Kobayashi |
| 2002/0135302 A1* | 9/2002 | Sakai ............... H01K 1/14 313/579 |
| 2004/0013418 A1 | 1/2004 | Kusuda et al. |
| 2004/0070324 A1* | 4/2004 | Lisitsyn ............... H01J 9/04 313/271 |
| 2006/0066193 A1 | 3/2006 | Ranish et al. |
| 2009/0236988 A1* | 9/2009 | Iida ............... H01J 61/327 313/631 |
| 2010/0302521 A1 | 12/2010 | Kuiper |
| 2011/0210273 A1 | 9/2011 | Kurt et al. |
| 2013/0223824 A1 | 8/2013 | Myo |
| 2014/0111080 A1* | 4/2014 | Bilikova ............... H01J 9/04 313/155 |
| 2018/0326660 A1* | 11/2018 | Gifford ............... B29C 64/209 |
| 2019/0110336 A1* | 4/2019 | Cong ............... H01K 1/58 |
| 2019/0318444 A1 | 10/2019 | Juarez et al. |
| 2021/0028075 A1 | 1/2021 | Zhu et al. |
| 2021/0285892 A1 | 9/2021 | Raj et al. |

FOREIGN PATENT DOCUMENTS

| | | |
|---|---|---|
| JP | 2003139519 A | 5/2003 |
| JP | 2004151057 A | 5/2004 |
| JP | 3119435 U | 3/2006 |
| JP | 2016102717 A | 6/2016 |
| KR | 19980050030 A | 9/1998 |
| KR | 20080012748 A | 2/2008 |
| KR | 20090128995 A | 12/2009 |
| KR | 20100082469 A | 7/2010 |
| KR | 101463120 B1 | 11/2014 |

OTHER PUBLICATIONS

Masakazu et al "Filament and Incandescent Lamp", Sep. 25, 2013, JP 2015 065 006A (Year: 2013).*

Nobuya et al "High-Frequency Inverter and Discharge Lamp Lighting Device", Sep. 30, 1989, JP 2000 106 295A (Year: 1989).*

Andreas et al "Foil for Electric Lamps and Electric Lamps, and Method for Producing a Glower", Feb. 13, 2012, DE 10 2012 202 081 A1. (Year: 2012).*

International Search Report and Written Opinion dated Dec. 27, 2022 for Application No. PCT/US2022/043990.

International Search Report and Written Opinion for PCT/US2021/022062 dated Jun. 25, 2021.

Non-Final Office Action dated Jun. 7, 2022 for U.S. Appl. No. 17/200,112.

Japanese Office Action dated Jun. 27, 2023 for Application No. 2022-555180.

* cited by examiner

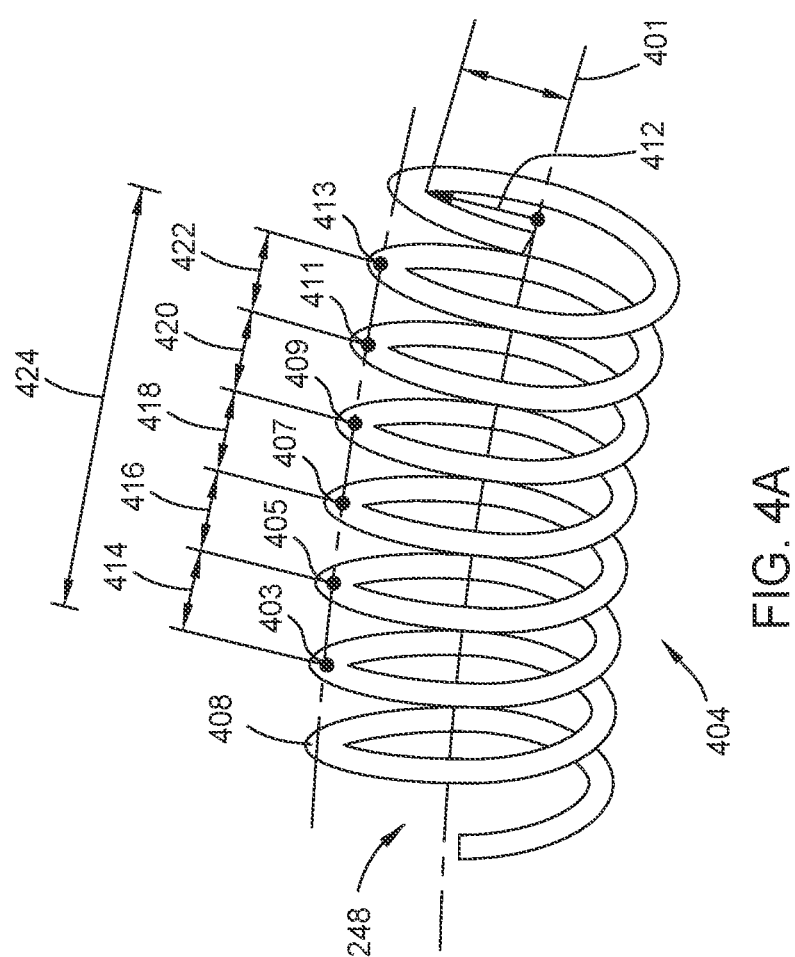

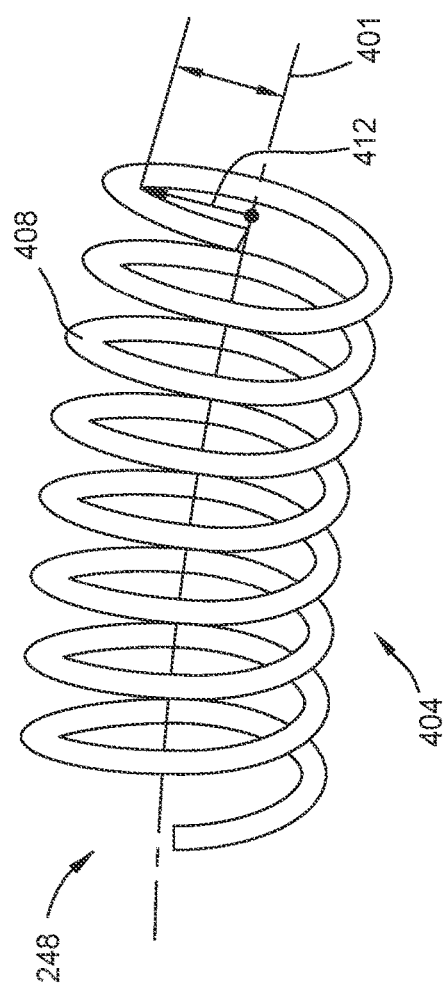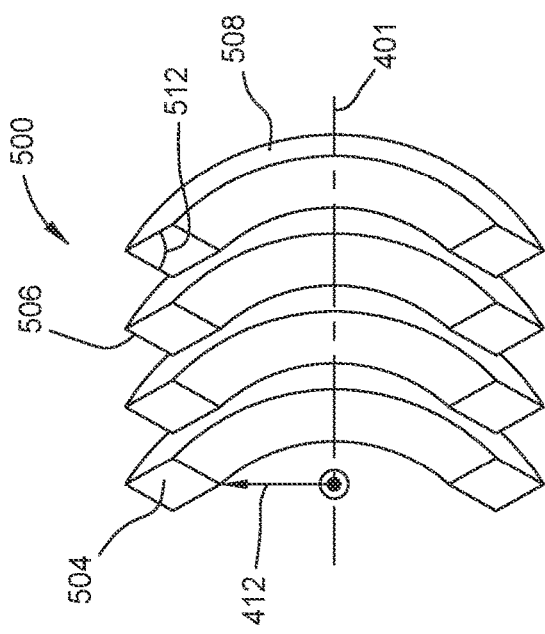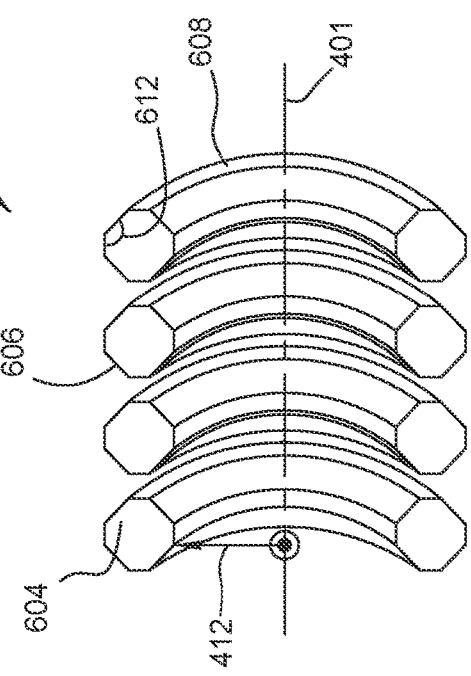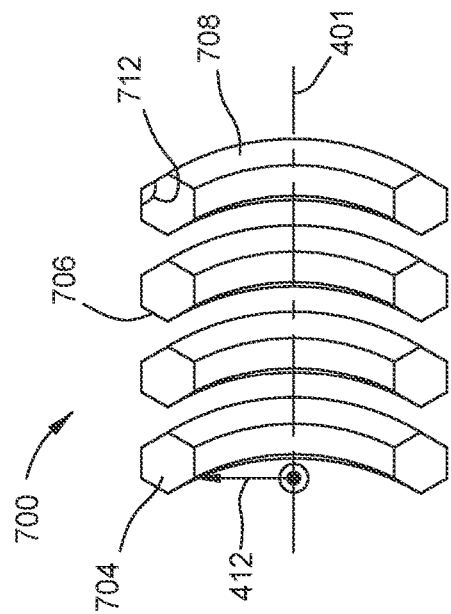
FIG. 4B
FIG. 5
FIG. 6
FIG. 7

APPARATUS AND METHOD FOR INSPECTING LAMPS

CROSS-REFERENCE TO RELATED APPLICATIONS

This application is a continuation of U.S. Non-Provisional patent application Ser. No. 17/200,112 filed Mar. 12, 2021, which claims benefit of U.S. Provisional Application Ser. No. 62/989,451 filed Mar. 13, 2020, each of which is incorporated by reference herein in its entirety.

BACKGROUND

Field

Examples disclosed herein relate to a method and apparatus for inspecting lamp dimensions.

Description of the Related Art

In substrate processing chambers, such as epitaxial deposition chambers, a quality of the deposited material can depend, among other things, on the uniformity of the temperature of the substrate. Control of a heat source is one manner of influencing a heat profile of the temperature across the substrate. Dimensions such as the size, shape, and angle of the heat source are parameters that influence a quality of the heat profile. When multiple heat sources are used in a processing chamber, control of the size, shape, and angle of the heat source directly correspond to the heat profile, and therefore the quality of material deposited on the substrate.

During routine maintenance of the processing chamber, individual heat sources may be replaced. Maintaining a consistent heat profile across the substrate enables greater uniformity for deposited material on the substrate between routine maintenance procedures.

New or replacement heat sources must be qualified prior to their use in the processing chamber. Assessing the quality of a given heat source may be accomplished by visual inspection or test gauges. If the heat source fails visual inspection or a measurement does not fit within an acceptable tolerance, the heat source may be discarded. When these quality assurance techniques are used, small samples of a batch of heat sources are examined in order to qualify the entire batch. Depending on the results of the sample, the entire batch may be discarded or determined acceptable. Accordingly, the un-sampled heat sources in the batch which has been qualified, may contain heat sources that are outside of acceptable tolerances. When non-conforming heat sources are accepted, these heat sources can be introduced into processing chambers and negatively influence the heat uniformity profile across the substrate. As such, deposition of material is negatively affected.

Therefore, there is a need for an improved quality assurance technique for heat sources that are used in processing chambers.

SUMMARY

Examples disclosed herein relate to a method and apparatus for inspecting a lamp. The method includes determining an actual measurement of a lamp. The lamp is configured to heat a substrate in a substrate processing apparatus. A window is generated, the window having a width and a height. The window is based upon a target measurement of the lamp. The method further includes generating a deviation based upon a difference between an image of the actual measurement and the window. The deviation is compared to a first threshold. The lamp is rejected if the deviation is outside the first threshold.

In another example, an image processing apparatus includes a camera. The camera has at least one lens and a controller. The controller is configured to perform a method for qualifying a lamp. The method includes determining an actual measurement of a filament of a lamp. The lamp is configured to heat a substrate in a substrate processing apparatus. The method further includes generating a window having a width and a height. The window is based upon a target measurement of the filament. The method further includes generating a deviation based upon a difference between an image of the actual measurement and the window. The deviation is compared to a first threshold. The lamp is rejected if the deviation is outside the first threshold.

Examples herein also include a non-volatile computer readable medium configured to store instructions thereon. When executed by a processor, the instructions cause a lamp inspection process to be performed. The process includes determining an actual measurement of a filament of a lamp. The lamp is configured to heat a substrate in a substrate processing apparatus. The process further includes generating a window having a width and a height. The window is based upon a target measurement of the filament. The process includes generating a deviation based upon a difference between an image of the actual measurement and the window. The deviation is compared to a first threshold. The lamp is rejected if the deviation is outside the first threshold.

BRIEF DESCRIPTION OF THE DRAWING

A method and apparatus for measuring and testing lamp dimensions for three-dimensionally printed lamp filaments are disclosed herein. So that the above recited features of the present disclosure can be understood in detail, a more particular description of the disclosure, briefly summarized above, may be had by reference to examples herein, some of which are illustrated in the appended drawings. However, it is to be noted that the appended drawings illustrate only examples and are therefore not to be considered limiting of the disclosure's scope. Accordingly, the appending drawings admit to other equally effective examples.

FIGS. 4A-4B illustrate a portion of a filament suitable for use in the exemplary lamps of FIGS. 2A-2B and 3A.

FIG. 5 is a cross-sectional view of an exemplary filament along a plane intersecting a central axis illustrated in FIGS. 4A-4B.

FIG. 6 is a cross-sectional view of another exemplary filament along the plane intersecting the central axis illustrated in FIGS. 4A-4B.

FIG. 7 is a cross-sectional view of yet another exemplary filament along the plane intersecting the central axis illustrated in FIGS. 4A-4B.

In order to facilitate understanding, identical reference numerals have been used, where possible, to designate identical elements that are common features. It is contemplated that elements and features of one example may be beneficially incorporated into other examples without further recitation.

DETAILED DESCRIPTION

Figure 1A:
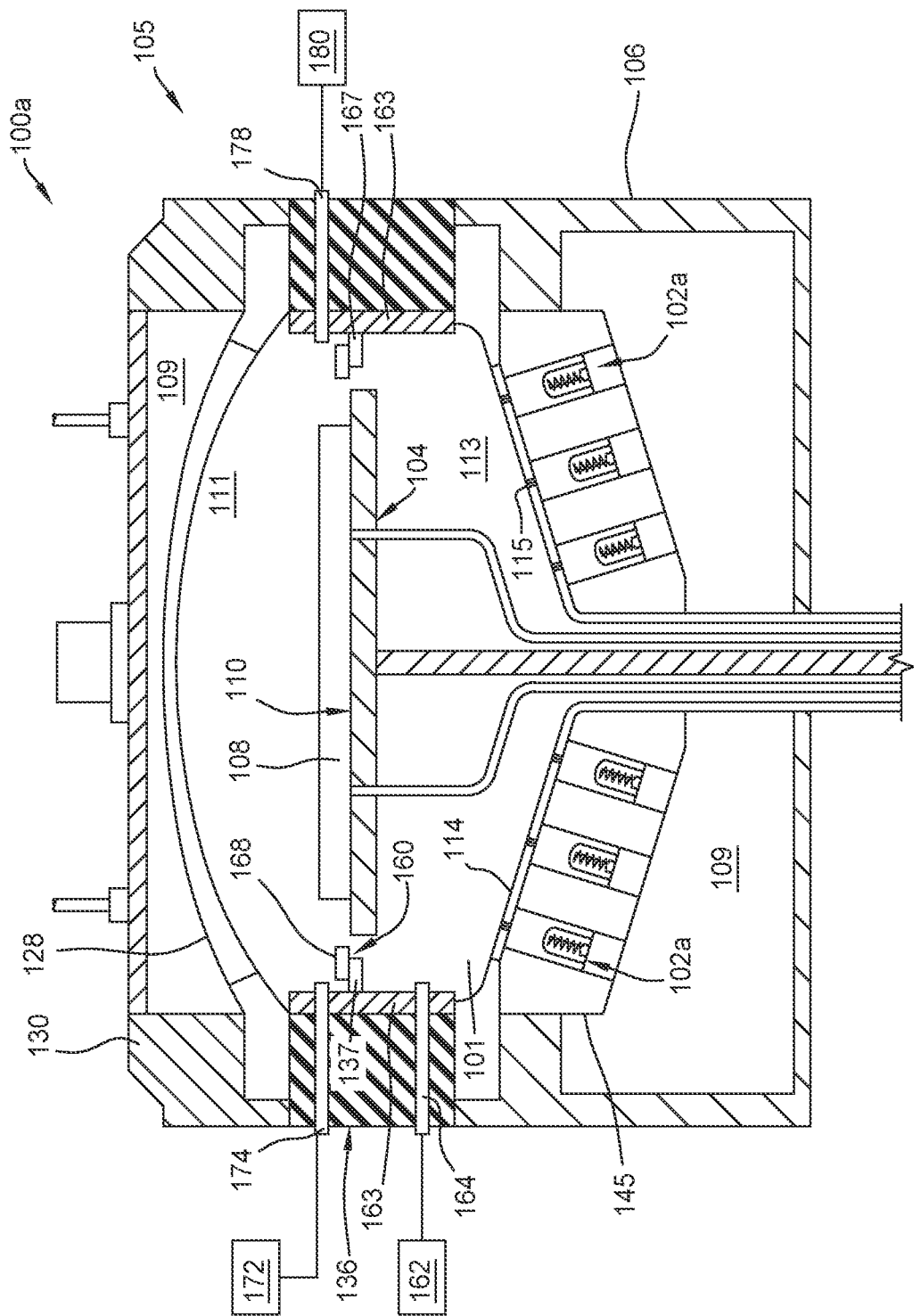
FIGS. 1A-1B show schematic cross-sectional views of exemplary processing chambers.

Epitaxy is one technique of depositing material on a substrate from reactions in a processing chamber. The processing chamber uses heat lamps, controlled by variable electrical power, to heat the substrate. The lamp can provide radiation from the visible to the near-infrared range. The substrate absorbs radiation from the lamps, thus increasing its temperature and suitability for depositing material. The lamp includes a filament that is made of a material that radiates light and heat when an electric current is passed therethrough. The lamp may be disposed in a gaseous environment that is designed to prolong the life of the filament.

A cross-section of a wire of the filament coil that is used in the lamp disclosed herein, can be substantially rhomboidal (e.g., diamond-shaped), pentagonal, or hexagonal. The cross-section of the wire of the lamp contributes to an increase in radiation per unit square meter (W/m$^2$). The shape of the cross-section of the filament coil increases the surface area of the filament coil and increases life of lamp. As compared to the conventional lamp, evaporated molecules of the filament are redeposited back to the filament coil, as further detailed below. Additionally, the overall geometry or cross-section of the filament coil decreases light reflected from an internal surface of the lamp's bulb back toward the filament coil. Routine maintenance is therefore reduced, as lamps in the processing chamber require less frequent replacement. By reducing the frequency of routine maintenance, processing chamber downtime is reduced and higher yield can be achieved per processing chamber.

The uniformity of the material deposited on the substrate correlates to the uniformity of heat across the surface of the substrate. Because the lamps are radiating heat, the uniformity of the lamps correlates to the uniformity of the heat gradient across the substrate. By controlling the heat gradient on the substrate, uniformity of material deposited on the substrate can consequently be controlled.

Disclosed herein is a method and apparatus for measuring and testing the lamp dimensions for lamp filaments suitable for use in a processing chamber. The method includes an automated visual inspection that captures images of a lamp configured for use in the processing chamber. The captured image of the lamp is transmitted to a computer for further processing, or is processed in the image processing apparatus. The computer or image processing apparatus compares predetermined dimensions to actual dimensions of the lamp measured by the image processing apparatus. Non-conforming lamps, i.e., lamps that exceed an error tolerance threshold, are rejected. Lamps that conform to predetermined dimensions are also appropriately flagged, i.e., qualified, and separated from the non-conforming lamps.

The uniformity of the material deposited on the substrate correlates to the uniformity of temperature across the surface of the substrate. Because the lamps are radiating heat across the surface of the substrate, the uniformity of the qualified lamps correlates to the uniformity of the heat gradient across the substrate. By controlling the heat gradient on the substrate thickness, material deposited on the substrate may be more precisely constrained. Advantageously, center to edge uniformity of deposition material on the substrate is improved by utilizing qualified lamps.

FIG. 1A is a schematic cross-sectional view of a processing chamber 100a having a plurality of heat sources 102a. The processing chamber 100a has a chamber body 105. The chamber body 105 includes sidewall(s) 136, a bottom 106, and a lid 130 that define an enclosure 109 of the chamber body 105. An upper dome 128, a lower dome 114, and liner(s) 163 are disposed in the enclosure 109. The liners 163 are affixed to the sidewalls 136. An internal volume 101 of the chamber body 105 is defined by the upper dome 128, the lower dome 114, and the liners 163. The internal volume 101 includes a processing volume 111 and a purge volume 113.

A process gas inlet 174 is formed through the sidewalls 136 of the processing chamber 100a. The process gas inlet 174 is also formed through the liner 163 and provides a pathway to flow process gases into the processing volume 111. Process gases flow from a gas source 172 through the process gas inlet 174 and across a substrate support 104 disposed within the internal volume 101 of the processing chamber 100a.

A purge gas inlet 164 is formed through the sidewalls 136 of the processing chamber 100a. The purge gas inlet 164 is also formed through the liner 163 and provides a pathway to flow purge gases into the purge volume 113. Purge gases flow from a purge gas source 162 through the purge gas inlet 164 and into the purge volume 113 of the processing chamber 100a.

A gas outlet 178 is disposed through the sidewall 136 and the liner 163. The gas outlet 178 is substantially opposite the process gas inlet 174 in the internal volume 101 of the processing chamber 100a. The gas outlet 178 enables process gases in the processing volume 111 of the internal volume 101 to be evacuated from the processing chamber 100a. Purge gases within the purge volume 113 of the internal volume 101 are also evacuated from the processing chamber 100a through the gas outlet 178. A vacuum source 180 is coupled to the gas outlet 178 to evacuate the process and purge gases from the internal volume 101 of the processing chamber 100a.

The substrate support 104 is configured to support a substrate 108 disposed on an upper surface 110 of the substrate support 104 during processing operations in the processing chamber 100a. The substrate support 104 may rotate the substrate 108 during processing to improve the uniformity of material deposited on the substrate 108. The upper dome 128 is disposed above the substrate support 104 and together with the upper surface 110 of the substrate support 104 and the liner 163 further define the processing volume 111. The purge volume 113 is further defined by the lower dome 114, a bottom surface (not numbered) of the substrate support 104, and the liner 163.

A heat shield assembly 160 surrounds the substrate support 104. The heat shield assembly 160 is a ring-like structure concentric with the substrate support 104. The heat shield assembly 160 includes an annular preheat member 167 and a heat shield member 168. The annular preheat member 167 is ring shaped.

A heat module 145 provides heat to the processing chamber 100a during processing. The heat module 145 may be positioned above or below, or both above and below, the substrate support 104. In the processing chamber 100a illustrated in FIG. 1A, the heat module 145 is provided below the substrate support 104. The heat module 145 may include optical elements 115, such as lenses, light pipes, or other reflective and refractive elements. The heat module 145 includes the plurality of heat sources 102. The heat sources 102 are disposed within the lower dome 114. The heat sources 102 may be any one of or a combination of lamps, light emitting diodes (LEDs), and lasers. The reflective and refractive elements are individually shaped to direct the energy emitted by the heat source 102 toward the substrate support 104. The heat from the heat module 145 heats the substrate support 104, which transfers heat to the substrate 108 by conduction where the substrate 108 is in contact with the substrate support 104. In some cases, heat may also be transferred by radiation, for example where the substrate 108 does not contact the substrate support 104. In one example, the heat sources 102 are lamps. Further discussion of the heat source 102 will be with regard to the lamps having filaments configured to radiate heat on the substrate 108 for processing within the processing chamber 100a.

Figure 1B:
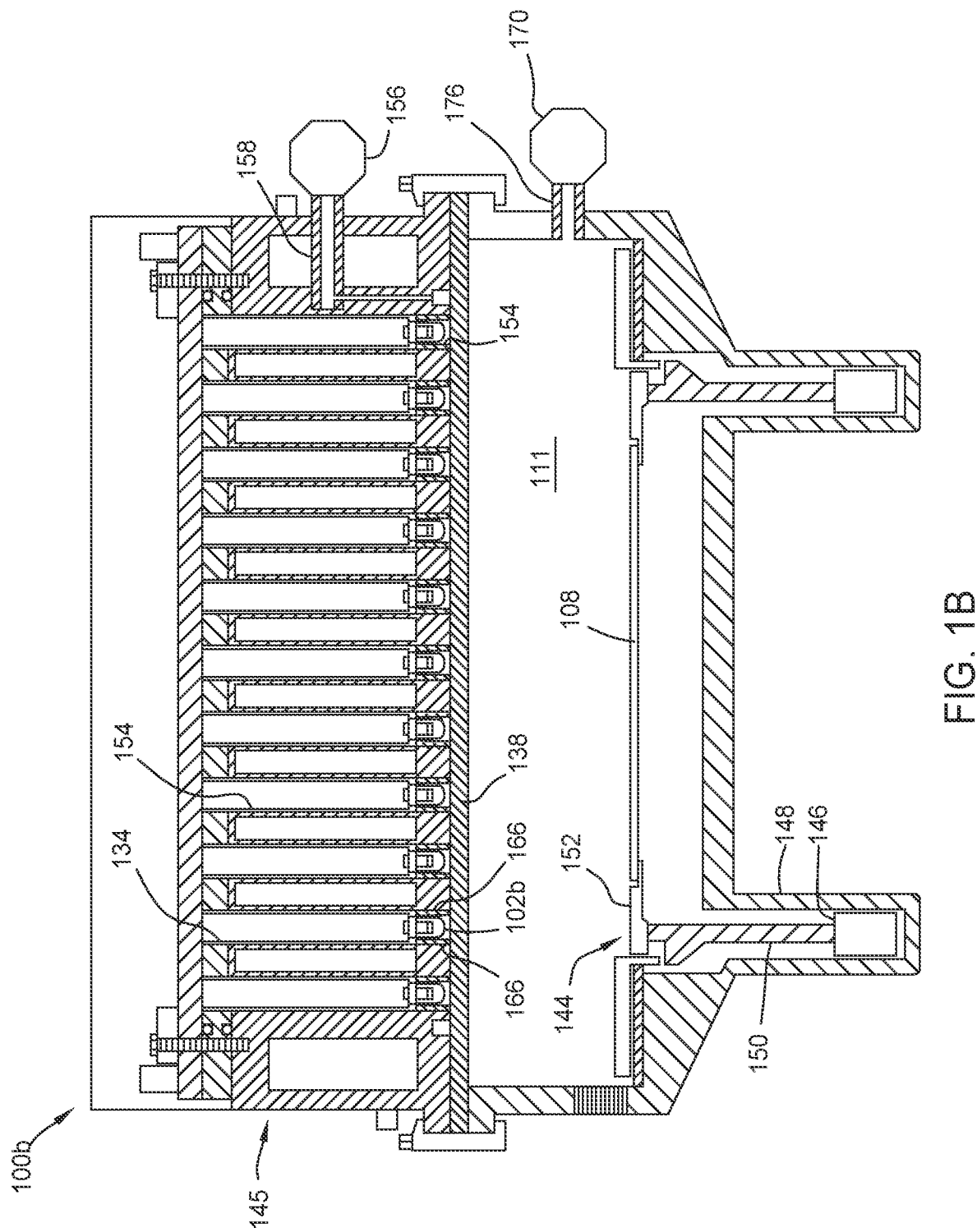

FIG. 1B is a schematic cross-sectional view of another processing chamber 100b configured to deposit material on the substrate 108. FIG. 1B provides context for the use of an alternative heat source 102b in a heat module 145 for heating the substrate 108 in the processing chamber 100b. In one example, the processing chamber 100b is configured as a rapid thermal processing (RTP) chamber. It should be understood that the processing chamber 100b depicted herein is for illustrative purposes, and the concept of the present disclosure may benefit any thermal process chamber using the light source, such as the heat source 102, for emitting radiant energy to heat substrate 108 for processing. Although the heat source 102b is shown disposed in lamp tubes 134 positioned adjacent a processing volume 111 above the substrate 108, the heat source 102b may alternatively be positioned in the processing chamber 100b below, or above and below, the substrate 108. The plurality of lamp tubes 134 is disposed within the processing volume 111 of the processing chamber 100b. The processing volume 111 is generally the space enclosed by sidewalls and body (shown but not numbered) of the processing chamber 100b, and separated from the lamp tubes 134 and heat source 102b by a window 138. The processing volume 111 may be held at pressure below atmospheric pressure.

The plurality of lamp tubes 134 are disposed in the heat module 145. The heat module 145 overlays the window 138, and the window 138 separates the heat module 145 from the processing volume 111. A substrate handling apparatus 144 includes a rotor 146 disposed within a rotor channel 148, and a support cylinder 150 resting on or otherwise coupled to the rotor 146. The support cylinder 150 may be coated with a silicon quartz. The rotor 146 may be magnetically-levitated. An edge ring 152 rests on the support cylinder 150. The edge ring 152 may be made of silicon-coated silicon carbide. The edge ring 152 is configured circumscribe and to support at least a portion of the substrate 108 during processing.

The heat module 145 includes the lamp tubes 134 and the heat sources 102b. As shown, one heat source 102b is disposed at one end of a respective lamp tube 134. The lamp tube 134 is configured to insert within a lamp housing tube 154. Alternatively, more than one heat source 102b may be housed within a respective one of the lamp housing tubes 154. Each lamp housing tube 154 can include a reflective inner surface, which may be a coating of silver or gold. The lamp housing tube 154 can be lined with a specular reflector 166. In one example, the heat sources 102b are radiation emitting light bulbs such as tungsten-halogen lamps.

The atmosphere of the processing chamber 100b and of the heat module 145 can be controlled. For instance, a first vacuum pump 156 is provided to control, for example, reduce, the pressure in the heat module 145 through a first channel 158 that is in fluid communication with the heat module 145, as is shown in FIG. 1. A second vacuum pump 170 is provided to control, for example, reduce, the pressure in the heat module 145 through a second channel 176. In one implementation, to prevent tarnishing of the specular reflector 166, the atmosphere around the heat source 102b is controlled to substantially minimize the amount of sulfide-forming or sulfide-catalyzing materials on the silver used on the specular reflector 166. One way of preventing tarnishing of the specular reflector 166 is to ensure that the atmosphere is substantially free of $H_2S$ and moisture ($H_2O$). For example, by flowing helium through first channel 158, atmospheric air can substantially be prevented from entering the area around the heat source 102b. In another example, a filter and/or getters may be disposed in the first channel 158 to remove $H_2S$ and moisture from the atmosphere surrounding the heat source 102b. Sulfide getters, for example, including metal oxides such as iron oxide substantially prevent atmospheric air from entering the area around the heat source 102b.

Figure 2A:
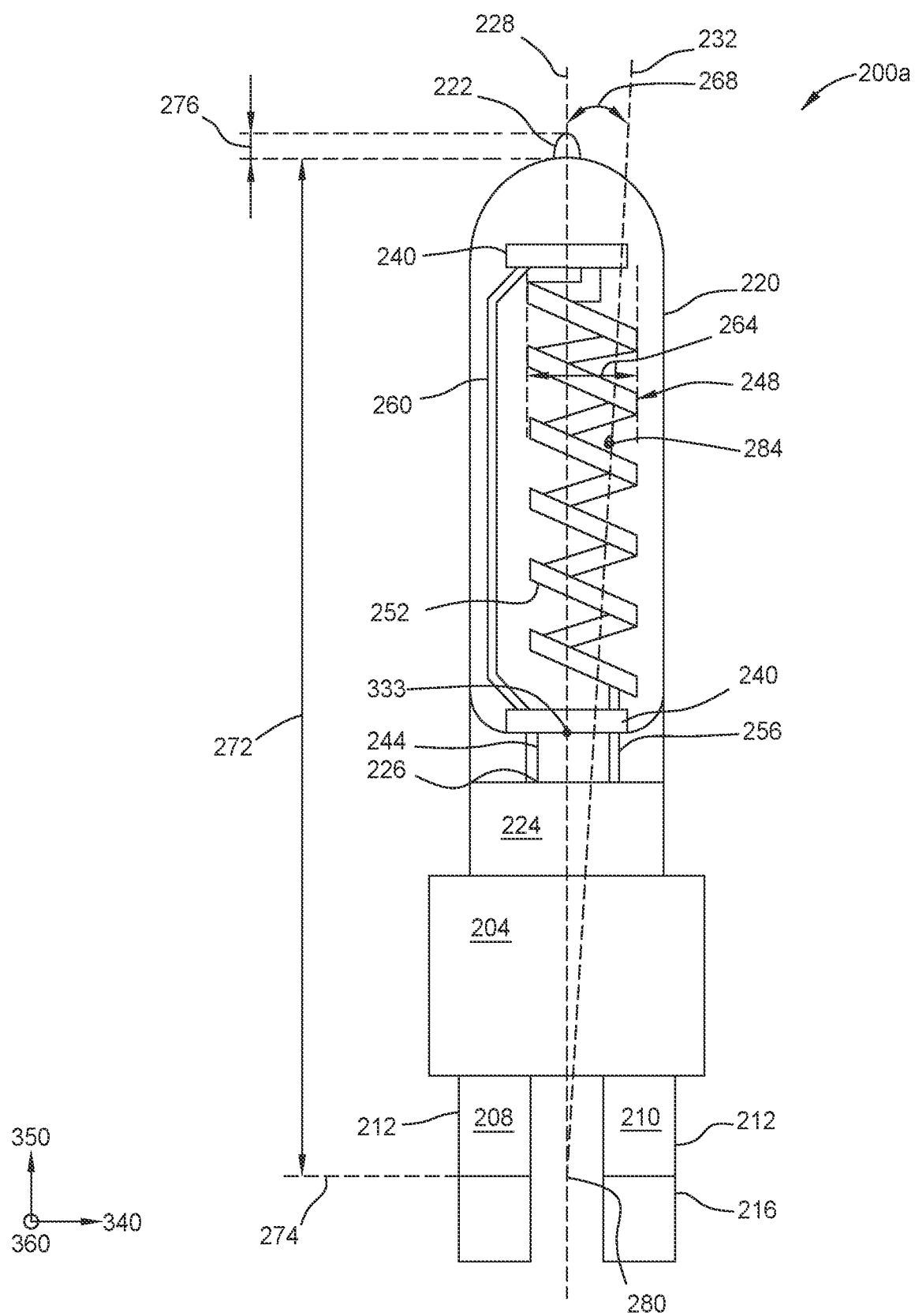
FIGS. 2A-2B illustrate front plan views of exemplary lamps that can be used as the heat source in the processing chambers of FIG. 1A-1B.

FIG. 2A is a frontal plan view of an exemplary lamp 200a that can be used as the heat source 102a in the processing chamber 100a shown in FIG. 1A. The lamp 200a has a base 204 and a dome 220. The dome 220 has a tip 222 at one end. In some examples, the dome 220 is made of quartz. A first pin 208 and a second pin 210 are connected to the base 204. Each of the first pin 208 and the second pin 210 has an upper portion 212 and a lower portion 216. The first pin 208 and second pin 210 are configured to detachably mount to the heat module 145 (shown in FIG. 1A). Additionally, a program establishes a first pin line 330 (shown in FIG. 2C) of the first pin 208 passes lengthwise, along a y-direction 350, through the center of the first pin 208. The second pin 210 has a second pin line 332 (shown in FIG. 2C) of the second pin 210 that passes lengthwise, along the y-direction 350, through the center of the second pin 210.

Attached to a bottom of the dome 220 is a support member 224. The support member 224 has holes 226 that are configured to receive a first connector 244 and a second connector 256. The holes 226 have contact electrodes that electrically couple the first pin 208 and the second pin 210 to the first connector 244 and second connector 256 respectively.

A filament 248 having an outer diameter 264 is disposed within the dome 220. The filament 248 has a coiled section 252. The filament 248 is formed from a wire 408 (as shown in FIG. 4). A portion of the wire 408 (shown in FIG. 4) of the filament 248 may be coiled or wrapped around a stub 240. The stub 240 is disposed proximate a top of the dome 220. A substantially identical stub 240 is disposed proximate a bottom of the dome 220. A ground wire 260 is electrically coupled to the filament 248 and extends along a vertical length (i.e., the y-direction 350) of the filament 248.

The first connector 244 is formed from a portion of the ground wire 260. The first connector 244 couples the ground wire 260 to the first pin 208. The second connector 256 electrically couples the second pin 210 to the filament 248. Thus, an electrical current entering the second pin 210 goes through the second connector 256 to the filament 248 before returning via the ground wire 260 and the first connector 244 and out the first pin 208.

In operation, an electrical current is applied to the filament 248, causing the filament 248 to radiate light and heat. In some examples of the instant disclosure, the filament is made of tungsten. Tungsten filaments can radiate infrared radiation at temperatures up to about 3,422° C. It is to be understood that other metals may be utilized without deviating from the scope of the disclosure. The dome 220 (e.g., a quartz bulb) is filled with a gas that is configured to extend the lifetime of the filament 248. The gas may have a low level of reactivity, such as any of, or a combination of, halogen gases, for example fluorine (F), chlorine (CI), bromine (Br), iodine (I), astatine (At), and tennessine (Ts). In one example, the dome 220 is filled with one or more halogen gases. According to the halogen cycle, when the electrical current is applied to the filament 248 a vapor is formed in the dome 220. The vapor includes molecules of evaporated tungsten. A halogenide, or halide, may form with the molecules of tungsten. Accordingly, some of the halogenide molecules redeposit on the filament 248. In this manner, the lifetime of the filament 248 and the lamp 200a is extended.

A program can establish a dividing plane 274 that orthogonally cuts through the first pin 208 and the second pin 210 at the intersection of the upper portion 212 and the lower portion 216. The dividing plane 274 extends in the x-direction 340 and a z-direction 360. The z-direction 360 is orthogonal to the x-direction 340 and the y-direction 350. A center line 228 is equidistant from the first pin line 330 the second pin line 332 (shown in FIG. 2C). The first pin line 330 passes through the first pin 208, and the second pin line 332 passes through the second pin 210. The center line 228 extends vertically in the y-direction 350. The center line 228 may pass through the middle, i.e., center, of the dome 220 and the support member 224. A first length 272 of the lamp extends from a top of the dome 220, minus the tip 222, to the dividing plane 274, extending between the upper portion 212 portion and lower portion 216 of the first pin 208 and second pin 210. The dividing plane 274 is substantially orthogonal to the center line 228. A second length 276 of the lamp 200a extends from the top of the dome 220, minus the tip 222, to the peak of the tip 222. Thus, the second length 276 is a measure of the tip 222 of the dome 220. The first pin line 330 and the second pin line 332 can be referred to herein as a first pin datum and a second pin datum respectively. The center line 228 may be referred to as datum center axis.

A center point 280 is defined by the intersection of the center line 228 and the dividing plane 274. A first deviation point 284 is a geometric center of a first coil box 320 (i.e., a first window shown in FIG. 2C), as viewed from the frontal plan view of the lamp 200a, as shown FIG. 2A. The first coil box 320 is a two-dimensional outline of the filament 248. As viewed from the frontal plan view, the outer diameter 264 is equal to a width of the first coil box 320. A length 304 of the coiled section 252 of the filament 248 (shown in FIG. 3A) is equal to a length of the first coil box 320. A first deviation line 232 passes through the center point 280 and the first deviation point 284. A first deviation angle 268 is defined by an angle between the center line 228 and the first deviation line 232. It is understood that the lamp 200a is not drawn to scale and the relationship between the center point 280 and the first deviation point 284 have been exaggerated in order to illustrate features of the disclosure.

Figure 2B:
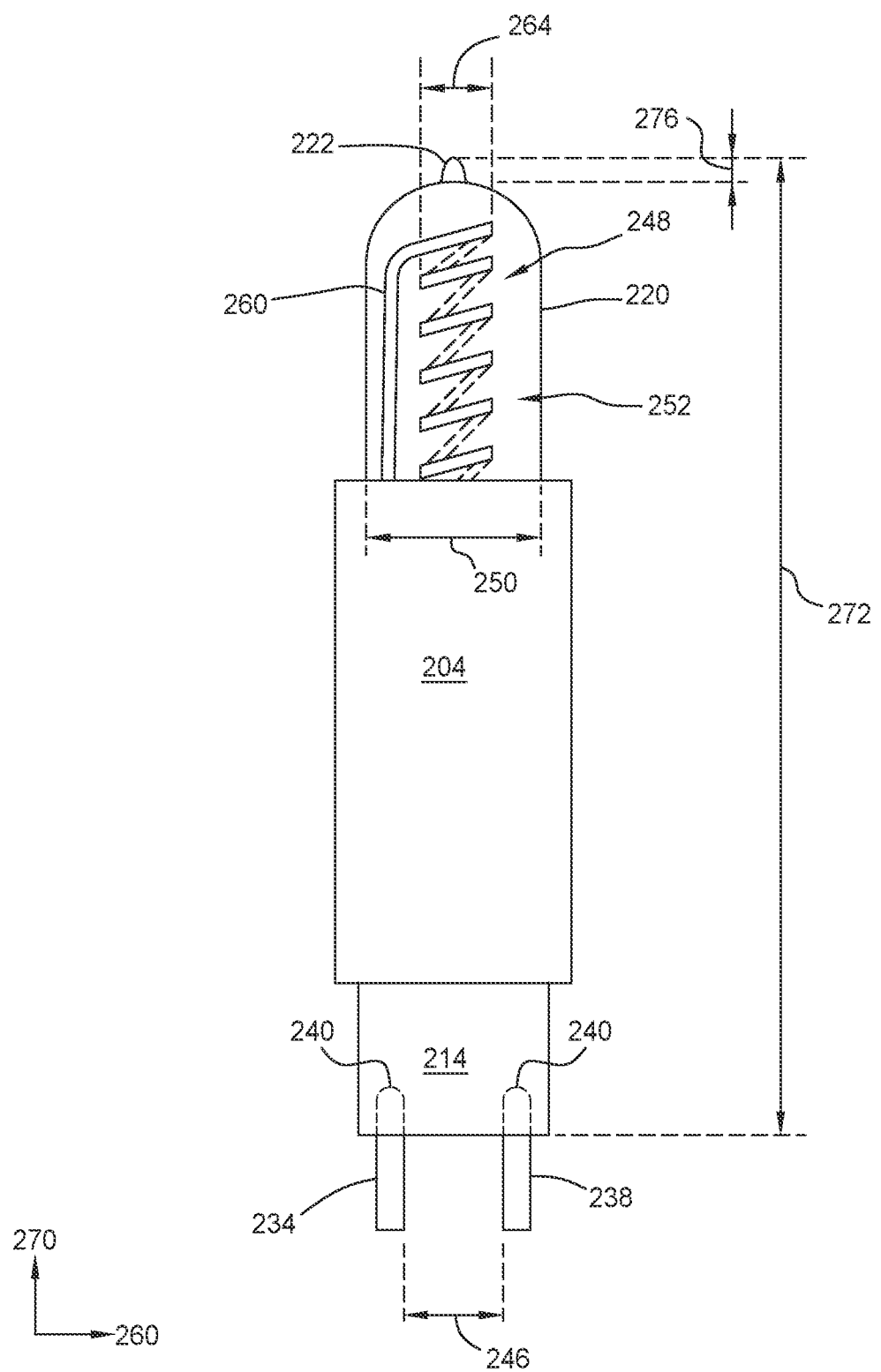

FIG. 2B is a frontal plan view of the exemplary heat source 102b that can be used in the processing chamber 100b shown in FIG. 1B. The heat source 102b has a base 204, a dome 220, and a pin section 214. In one example, the dome 220 may be a dome in the general shape of cylinder, where one end of the cylinder may have a hemispherical end. The heat source 102b may also have a tip 222 at one end of the dome 220. In some examples, the dome 220 is made of quartz, or other suitable material.

The heat source 102b includes a filament 248 disposed within the dome 220. The filament 248 has an outer diameter 264. The filament 248 is formed from a wire 408 (shown in FIGS. 4A-4B). The filament 248 includes a coiled section 252 that extends in a y-direction 270 within an interior of the dome 220. Stated differently, the coiled section 252 of the filament 248 extends in the y-direction 270 aligned with the long axis of the heat source 102b. The coiled section 252 is substantially helical, but may have other shapes. The filament 248 is attached to a ground wire 260.

The pin section 214 includes a first pin 234 and a second pin 238. The first pin 234 and the second pin 238 are configured to be coupled to electrodes (not shown) disposed within the lamp housing tube 154. The base 204 may include electrodes, circuits, and other components necessary to couple the filament 248 and/or the ground wire 260 to the first pin 234 and the second pin 238.

A first length 272 of the heat source 102b is defined between a distal end of the tip 222 to a bottom of the pin section 214 (excluding the pins 234, 238). The first length 272 of the heat source 102b is between about 120 mm and 135 mm. In one example, the first length 272 is about 125 mm. A width 246 between the first pin 234 and the second pin 238 is between about 6 mm to about 8 mm. The dome 220 has an exterior diameter 250 of between about 11 mm to about 17 mm. The outer diameter 264 of the coiled section 252 of the filament 248 is between about 3 mm to about 7 mm. It is contemplated that other geometries may be utilized for particular applications.

In operation, an electrical current is applied to the filament 248, causing the filament 248 to radiate light and heat. In some examples of the instant disclosure, the filament is made of tungsten or other suitable conductor. Tungsten filaments radiate infrared radiation at temperatures up to about 3,422° C. It is to be understood that other metals may be utilized without departing from the scope of the disclosure. The dome 220 (e.g., a quartz bulb) is filled with at least one gas that is configured to extend the lifetime of the filament 248. The gas may have a low level of reactivity, such as one or more noble gases. Other gases may also be present in the bulb. The gas(es) reduces the rate at which the filament 248 disintegrates, and therefore extends the lifetime of the heat source 102b.

Figure 2C:
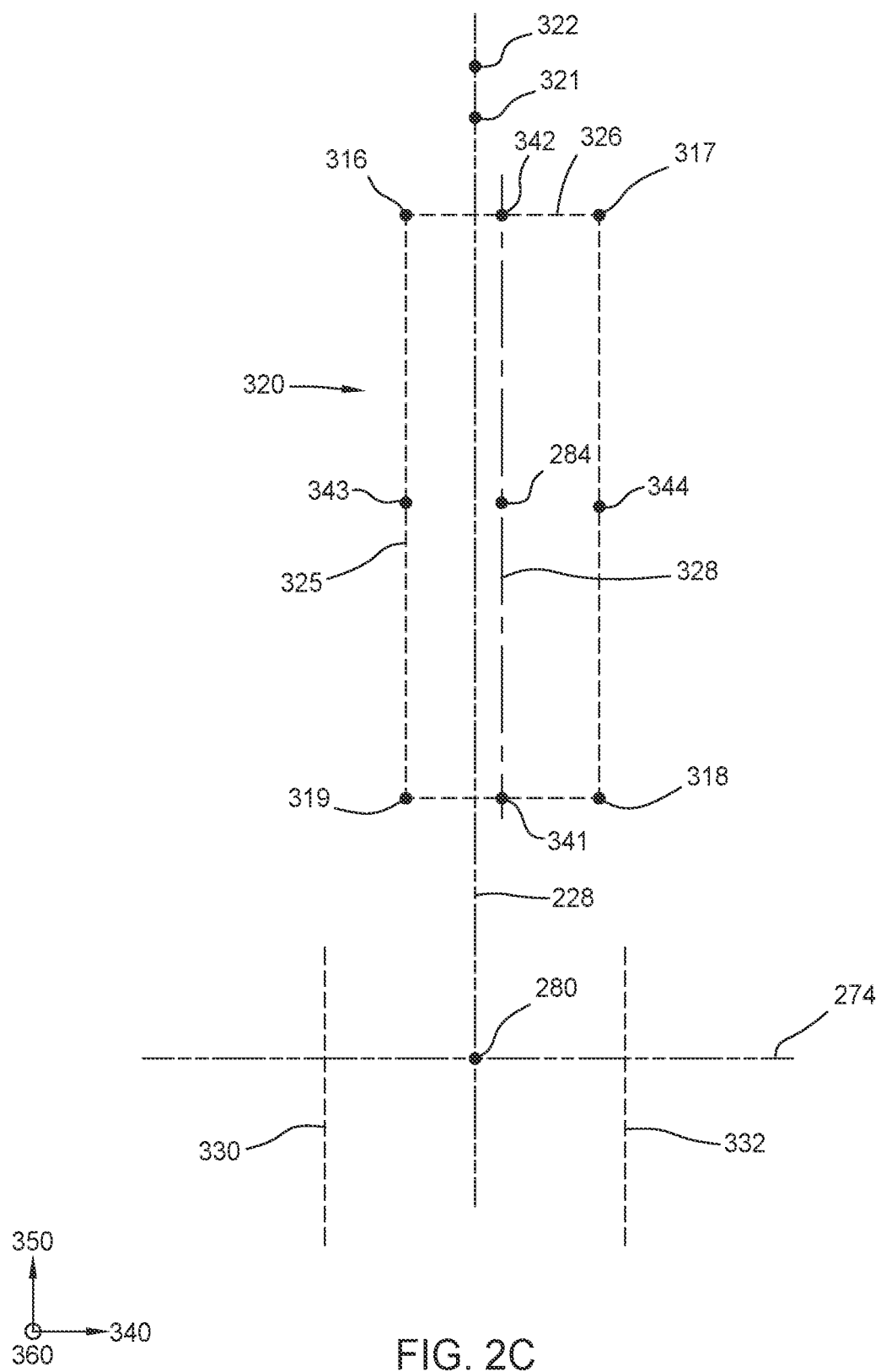
FIG. 2C is an illustration of a manner of measuring frontal plan view dimensions of the lamps illustrated in FIGS. 2A-2B.

FIG. 2C is an illustration of a manner of measuring frontal plan view dimensions of the lamp 200a illustrated in FIG. 2A. It should be understood that while the following discussion is directed to the lamp 200a, the method disclosed herein can also be applied to lamp 200b. As discussed, the filament 248 is disposed within the dome 220 of the lamp 200b. The center point 280 is determined by the intersection of the center line 228 and the dividing plane 274. The first deviation point 284 can be determined, for example, by establishing the edges of the coiled section 252 of the filament 248 from the front plan view as shown in FIG. 2A. A digital representation of the filament 248 has at least two horizontal edges 326 that extend in the x-direction 340 and two vertical edges 325 that extend in the y-direction 350. The two horizontal edges 326 are extended in the x-direction 340 until intersecting with the two vertical edges 325 that extend in the y-direction 350. The intersection of the first horizontal edge 326 and two parallel vertical edges 325 intersect at a first point 316 and a second point 317. A third point 318 and forth point 319 are the intersecting points of the second horizontal edge 326 and two parallel vertical edges 325. The first coil box 320 is created by connecting the four points 316-319 with two sets of parallel lines. The coil center line 328 extends in a y-direction 350 substantially parallel to the center line 228. The first deviation point 284 is the intersection of a diagonal line (not shown) extending from the first point 316 to the third point 318, and another diagonal line (not shown) extending from the second point 317 to the fourth point 319. The first deviation point 284 is therefore a vertical and horizontal center point of the first coil box 320. The coil center line 328 passes through the first deviation point 284. A width is determined by the distance between two parallel points in the x-direction 340 direction. A length is determined by the distance between two parallel points in the y-direction 350 direction. In one or more embodiments, the first coil box 320 includes a first coil end point 341, a second coil end point 342, a first coil edge point 343, and a second coil edge point 344. The horizontal edges 326 can extend through the first and second coil end points 341, 342. The vertical edges 325 can extend through the first and second coil edge points 343, 344.

The outer diameter 264 of the filament 248, as seen from the side plan view in FIG. 2A, is determined based upon a distance between the first point 316 and second point 317. Alternatively, the outer diameter 264 can be determined based upon a distance between the third point 318 and fourth point 319. Alternatively, the outer diameter 264 can be determined based upon a distance between the first coil edge point 343 and the second coil edge point 344. The first length 272 (shown in FIG. 2A) can be measured by determining the distance between the center point 280 and a fifth point 321, which is located at the top of the dome 220. The second length 276 is the distance between a sixth point 322 and the fifth point 321, the sixth point 322 indicating the tip 222 of the dome 220.

Figure 3A:
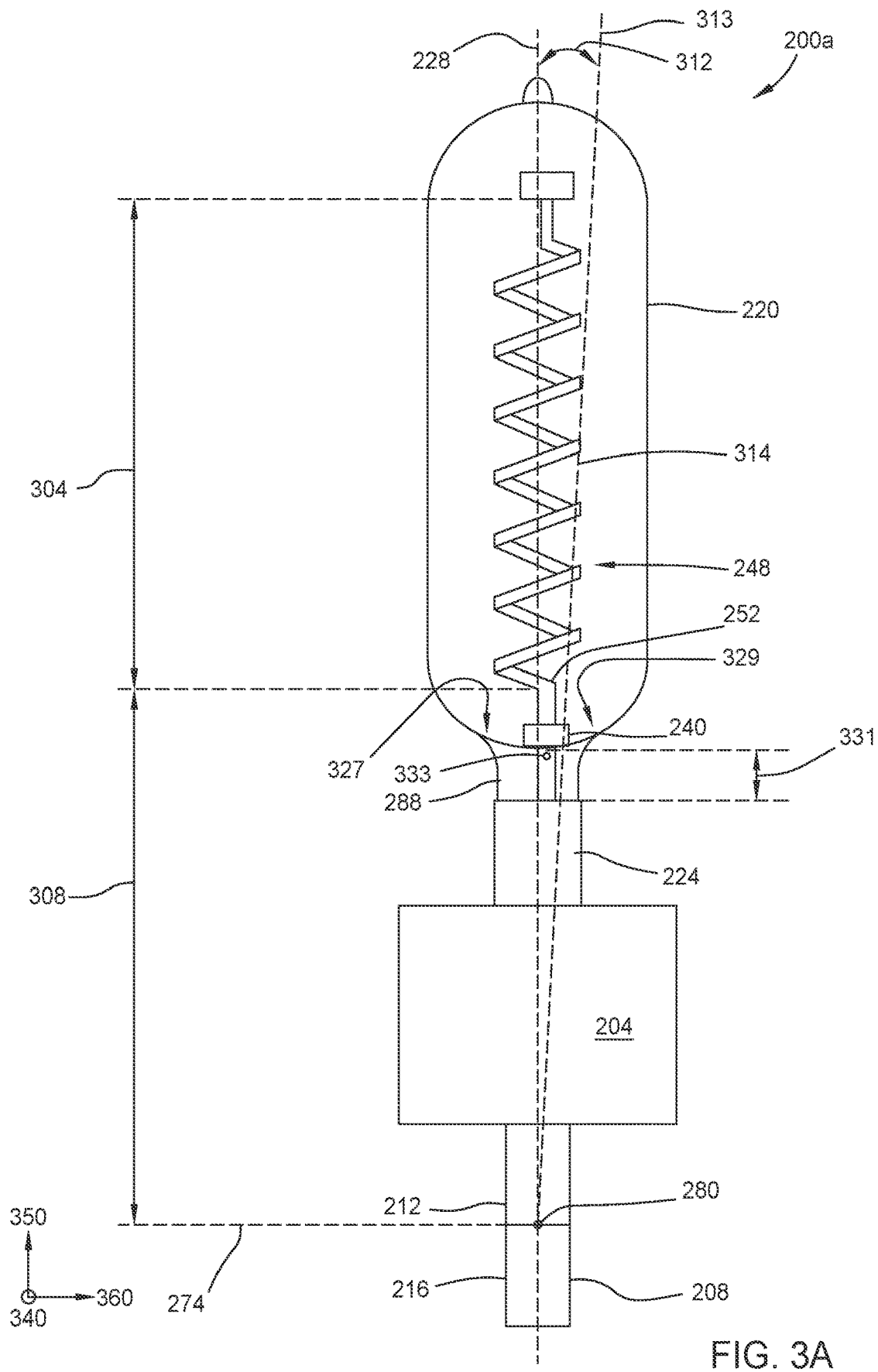
FIG. 3A is a side plan view of the exemplary lamp shown in FIG. 2A.

FIG. 3A is a side plan view of the exemplary lamp 200a shown in FIG. 2A. The lamp 200a illustrated in FIG. 2A is rotated by 90 degrees in FIG. 3A. For simplicity, the ground 260 is not depicted in FIG. 3A. From this side plan view, the length 304 of the coiled section 252 of the filament 248 is determined. The dividing plane 274 extends in a z-direction 360 between the upper portion 212 and lower portion 216 of either the first pin 208 or the second pin 210 (shown in FIG. 2A). A vertical distance 308 of filament 248 is determined by measuring the distance from the dividing plane 274 to a beginning of point of the coiled section 252. A second deviation angle 312 is determined in a similar manner to the first deviation angle 268. Specifically, the second deviation angle 312 is an angle between the center line 228 and a second deviation line 313 that passes through a center point 280 and a second deviation point 314. The second deviation point 314 is a geometric center of a second coil box 370 (i.e. a second window shown in FIG. 3B), as viewed from the side plan view of the lamp 200a in FIG. 3A. The second coil box 370 is a two-dimensional outline of the filament 248 as viewed from the side plan view of FIG. 3A. The outer diameter 264 is equal to a width of the second coil box 370. The length 304 of the coiled section 252 of the filament 248 is equal to a length of the second coil box 370. As stated, the center point 280 is the intersection of the center line 228 and the dividing plane 274. The second deviation point 314 is a geometric center of a two-dimensional representation of the filament 248 when viewed from the position of the lamp 200a illustrated in FIG. 3A. As stated above, the second deviation angle 312 is measured when the lamp 200a is rotated by 90 degrees from the position illustrated in FIG. 2A.

A first radius of curvature 327 and a second radius of curvature 329 can be determined in substantially the same manner. For example, the first radius of curvature 327 may be determined after an image processing apparatus 1000 captures an image of the lamp 200a. The first radius of curvature 327 may be calculated by using image processing techniques to determine a gradient, slope, or edges of the dome 220. It is understood that other image processing techniques may be used to determine the dimensions disclosed herein without departing from the scope of the disclosure.

A gap distance 331 is measured vertically from a bottom point 333 of the dome 220 to a point on a surface of support member 224, as illustrated in FIG. 3A. The surface of the support member 224 is substantially perpendicular to the z-direction 360. The gap distance 331 is shown proximate to the second radius of curvature 329. However, the gap distance 331 may also be taken proximate the first radius of curvature 327. As such, a magnitude of the gap distance 331 may be the same value whether the gap distance 331 is determined proximate the first radius of curvature 327 or the second radius of curvature 329. However, depending on whether the gap distance 331 is determined proximate the first radius of curvature 327 or the second radius of curvature 329, in other examples, the magnitude of the gap distance 331 may have different values.

Figure 3B:
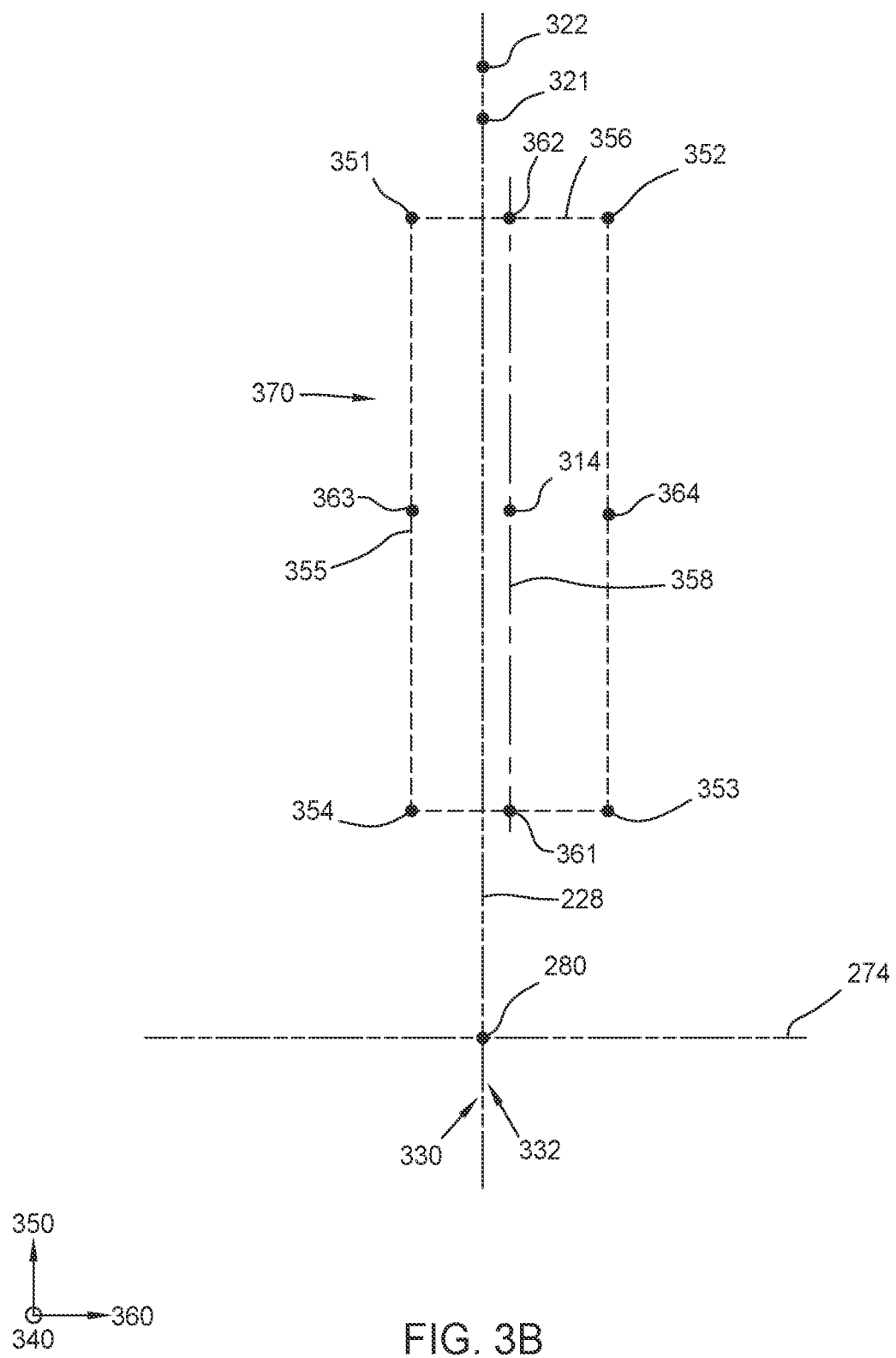
FIG. 3B is an illustration of a manner of measuring the side plan view dimensions of the lamp illustrated in FIG. 3A.

FIG. 3B is an illustration of a manner of measuring the side plan view dimensions of the lamp 200a or the lamp 200b illustrated in FIG. 3A. The foregoing discussion is directed to the lamp 200a, the method disclosed herein can also be applied to lamp 200b. As discussed, the filament 248 is disposed within the dome 220 of the lamp 200a,b. The center point 280 is determined by the intersection of the center line 228 and the dividing plane 274. The second deviation point 314 can be determined, for example, by establishing the edges of the coiled section 252 of the filament 248 from the side plan view as shown in FIG. 3A. The filament 248 has at least two horizontal edges 356 that extend in a z-direction 360 and two vertical edges 355 that extend in a y-direction 350. The two horizontal edges 356 are extended in the z-direction 360 until intersecting with the two vertical edges 355 that extend in the y-direction 350. The intersection of the first horizontal edge 356 and two parallel vertical edges 355 intersect a first point 351 and a second point 352. A third point 353 and forth point 354 are the intersecting points of the second horizontal edge 356 and two parallel vertical edges 355. The second coil box 370 is created by connecting the four points 351-354 with two sets of parallel lines. The coil center line 358 extends in a y-direction 350 substantially parallel to the center line 228. The second deviation point 314 is the intersection of a diagonal line (not shown) extending from the first point 351 to the third point 353, and another diagonal line extending from the second point 352 to the fourth point 354. The second deviation point 314 is therefore a vertical and horizontal center point of the second coil box 370. The coil center line 358 passes through the second deviation point 314. In one or more embodiments, the second coil box 370 includes a first coil end point 361, a second coil end point 362, a first coil edge point 363, and a second coil edge point 364. The horizontal edges 356 can extend through the first and second coil end points 361, 362. The vertical edges 355 can extend through the first and second coil edge points 363, 364.

FIG. 4A is a portion of the filament 248 utilized in lamp 200a or lamp 200b shown in FIGS. 2A-2B and FIG. 3A. The portion of the filament 248 has a pitch gradient 424. Considering an imaginary line (not shown) extending parallel to the central axis 401, a pitch is defined as a center to center distance from a first point 403 on the wire 408 that intersects the imaginary line to a second point 405 on the wire 408 that intersect the imaginary line. The second point 405 on the wire 408 is about 360 degrees from the first point 403 along a helical circumference of the wire 408. A pitch is defined as the difference between two adjacent points, e.g., the first point 403 and the second point 405. The pitch gradient 430 is defined by the differences between three or more points (e.g., the magnitudes of the pitches between the three or more points), such as the difference between a first point 403 and the second point 405 (e.g., a magnitude of the first pitch 414 discussed below), the difference between the second point 405 and a third point 407 (e.g., a magnitude of the second pitch 416 discussed below), and/or the difference between the third point 407 and a fourth point 409 discussed below (e.g., a magnitude of the third pitch 418 discussed below). The third point 407 is about 360 degrees apart from the second point 405, and about 720 degrees apart from the first point 403 along the circumference of the wire 408. It is understood that additional points are about 360 degrees away from adjacent points on the wire 408.

A first pitch 414 is defined as a distance between the first point 403 and the second point 405. A second pitch 416 is defined as a distance between the second point 405 and the third point 407. A third pitch 418 is defined as a distance between the third point 407 and a fourth point 409. A fourth pitch 420 and fifth pitch 422 are defined similarly, as a distance between adjacent points 409-413. In the example illustrated, the first pitch 414 is less than the second pitch 416, and the second pitch 416 is less than the third pitch 418. As such, the pitch gradient 424 of the filament 248 increases in a direction extending from the first point 403 to a sixth point 413. Accordingly, the pitch gradient 424 increases from the first pitch 414 to a fifth pitch 422, such that each adjacent pitch increases in the direction of the pitch gradient 424, and such that the pitch gradient 424 is defined by the differences between the first through fifth pitches 414-422. The pitch gradient 424 can be linear or non-linear. Each one of the points 403-413 is part of a respective coil of a plurality of coils of the wire 408 shown in FIG. 4A.

In one example, the pitch gradient 424 of the filament 248 increases in the direction of gravity. The first point 403 is closer to the base 204 than the tip 222 of the dome 220. Conversely, the sixth point 413 is closer to the tip 222 of the dome 220 than the base 204. When the filament 248 is disposed in the lamp 200b, the first pitch 414 is adjacent the base 204 and is less than the second pitch 416, and the second pitch 416 is less than the third pitch 418. The third pitch 418 is closer to the tip 222 than the first pitch 414. Advantageously, when the lamp 200a or the lamp 200b is installed in the heat module 145, the pitch gradient 424 enables the filament 248 to maintain an integrity of the coiled section 252. In some examples, the integrity of the coiled section 252 is maintained for about 20 percent longer than the conventional lamp (not shown).

After several thousand process runs, heating and cooling of the wire 408 can cause the coiled section 252 of the filament 248 to deform. In the conventional lamp, gravity worsens this deformation as the material of the wire 408 heats and cools, enabling greater deformation. This repeated deformation of a conventional filament caused by temperature changes and gravitational pull on the mass of the wire, leads to failure of the conventional lamp. Advantageously, the pitch gradient 424 impedes the deformation caused by repeated stress caused by heating and cooling of the filament 248, thus enabling the filament 248 to maintain integrity. In one example, after about 20,000 to about 25,000 process runs, the first pitch 414, the second pitch 416, and the third pitch 418 may be substantially equal. In another example, the first pitch 414 through fifth pitch 422 are substantially equal after about 20,000 to about 25,000 process runs.

As previously explained, the pitch gradient 424 increases in the direction of gravity. As such, when the filament 248 is installed in the lamp 200a of processing chamber 100a, the first point 403 is closer to the tip 222 of the dome 220 than the second point 405. Accordingly, the first pitch 414 is closer to the substrate support 104 or the substrate 108 than the second pitch 416, or the subsequent pitches 418-422. Conversely, when the filament 248 is installed in the lamp 200b of the processing chamber 100b, the first point 403 is further away from the tip 222 of the dome 220 than the second point 405. As such, the first pitch 414 is further away from the substrate 108 than the second pitch 416 and the subsequent pitches 418-422.

In one example, a ratio between the last pitch and the first pitch among the pitches 414-424 is between about 2.0 and about 2.3, such as between about 2.05 and about 2.25. In another example, the ratio is between about 2.1 and about 2.15. In yet another example, where the point 403 is closest to the base 204 and the point 413 is closest to the tip 222, the pitch 414 is between about 1.0 mm and about 1.5 mm, and the pitch 422 is between about 2.0 mm and about 3.45 mm. Pitch 416 is about 1.125 times the length of pitch 414, in one example. As such, the pitch gradient 424 is greater than zero (0). In one example, the pitch gradient 424 is defined as: $0.005 \text{ mm} < \{(P_{n+2}-P_{n+1})-(P_{n+1}-P_n)\} > 0.125$ mm, where n is a given point, and n+1 is an immediately adjacent point and the point n is closer to the base 204. In another example, the pitch gradient 424 is defined as: $0.005 \text{ mm} < \{(P_{n+2}-P_{n+1})-(P_{n+1}-P_n)\} > 0.166$ mm. For example, $P_n$ can be pitch 414, $P_{n+1}$ is pitch 416, and $P_{n+2}$ is pitch 418, and the initial point can be point 403.

In yet another example, the gradient pitch 424 can increment such that that a given pitch, $P_n=P_0+(n*s)$, where n is a number of a given pitch in a given set of pitches, $P_0$ is the first pitch in the sequence of pitches, and s is a step. The step (s) is a positive real number, and can be between about 0.005 mm and about 0.166 mm, such as about 0.0156 mm, 0.020 mm, or about 0.125 mm. In still yet another example, the step (s) can be equal to the initial pitch, $P_0$. In this example, $P_0$ can be a distance equal to pitch 414, and $P_n$ can be any one of the pitches pitch 414-422. As noted above, the pitch gradient 424 increases in the direction of gravity. Advantageously, the filament 248 with the pitch gradient 424 can have a 20 percent longer operational period than the conventional filament, extending the useful life of the lamp 200a and lamp 200b. In yet another example, the pitch gradient 424 can increase between about 2 percent and about 6 percent between successive pitches, such as about 2 percent, 3 percent, 4 percent, 5 percent, or about 6 percent.

FIG. 4B is a portion of the filament 248 utilized in the exemplary lamp 200a or 200b of FIGS. 2A-2B and 3A. Only a section 404 of the filament 248 is illustrated herein. It is to be understood that any discussion of the section 404 necessarily includes the filament 248, and any discussion of the filament 248 is also attributable to the section 404. As illustrated, a section 404 of the filament is made of the wire 408 that is positioned at a substantially constant radial distance 412 from a central axis 401 axis. It is understood however that constant radial distance 412 may increase or decrease without departing from the disclosure herein. The central axis 401 is substantially helical, such that when the section 404 is extended the length 304 of the filament 248, the coiled section 252 of the filament 248 is formed by the wire 408 (shown in FIGS. 2A, 2B, and 3A). The filament 248 in FIG. 4B has a pitch gradient 424 of substantially zero (0). As such, the pitches 414-422 (not shown in FIG. 4B) are substantially equal, and therefore there is substantially no gradient.

According to one or more methods of fabricating a filament for a lamp, the filaments described in FIGS. 5-7 may be fabricated by additive manufacturing or other suitable techniques such as extrusion. In one example, the filaments are fabricated by a three-dimensional printing techniques (i.e., 3.-D printing). The cross-sectional surfaces discussed below reduce shear between the grain boundaries of the filament(s) 500-700. Reducing the shear between grain boundaries of the filament(s) 500-700 increases the lifespan of the filaments 500-700, and thereby increasing the useful life of the lamp 200. By increasing the useful life of the lamp 200a or lamp 200b, routine maintenance and processing chamber 100 downtime are also reduced, thus increasing the overall yield of the processing chamber 100. It should be understood that the discussion of some properties of a polygons such as a rhombus, hexagon, and pentagon discussed herein is not exhaustive. The discussion of these geometries does not preclude properties not explicitly expressed.

FIG. 5 is a cross-sectional view of an exemplary filament 500 along a plane intersecting the central axis 401 illustrated in FIG. 4A. The filament 500 is made of a wire 508 that is positioned at the radial distance 412 from the central axis 401. A cross-section 504 of the wire 508 is substantially diamond-shaped or rhomboidal, the cross-section 504 having four sides 506. The cross-section 504 of the filament 500 has two consecutive sides 506 that are equal in length. Opposite sides 506 of the cross-section 504 may be substantially parallel. An angle 512 is formed between two consecutive sides 506. Another angle opposite the angle 512 is substantially equal in magnitude. The angle 512 may be about 90 degrees. However, the angle 512 is not limited to 90 degrees, and can have any magnitude so long as the sum of each of the internal angles is 360 degrees.

FIG. 6 is a cross-sectional view of another exemplary filament 600 along the plane intersecting the central axis 401 illustrated in FIG. 4A. The filament 600 is made of a wire 608 that is positioned a constant radial distance 412 from the central axis 401. A cross-section 604 of the wire 608 is substantially hexagonal, the cross-section 604 having six sides 606. An angle 612 is formed between two adjacent sides 606. In an example, the angle is 120 degrees, but the angle 612 is not limited to this degree. The angle 612 can be any angle such that the sum of all of the internal angles is 720 degrees.

FIG. 7 is a cross-sectional view of an exemplary filament 700 along a plane intersecting a central axis 401 illustrated in FIG. 4A. The filament 700 is made of a wire 708 a constant radial distance 412 from a central axis 401. A cross-section 704 of the wire 708 is substantially pentagonal, the cross-section 704 having five sides 706. An angle 712 is formed between two adjacent sides 706. The angle may be about 108 degrees. The angle 712 is not limited to this degree, and can have any magnitude so long as the sum of each of the internal angles is 540 degrees.

Figure 8:
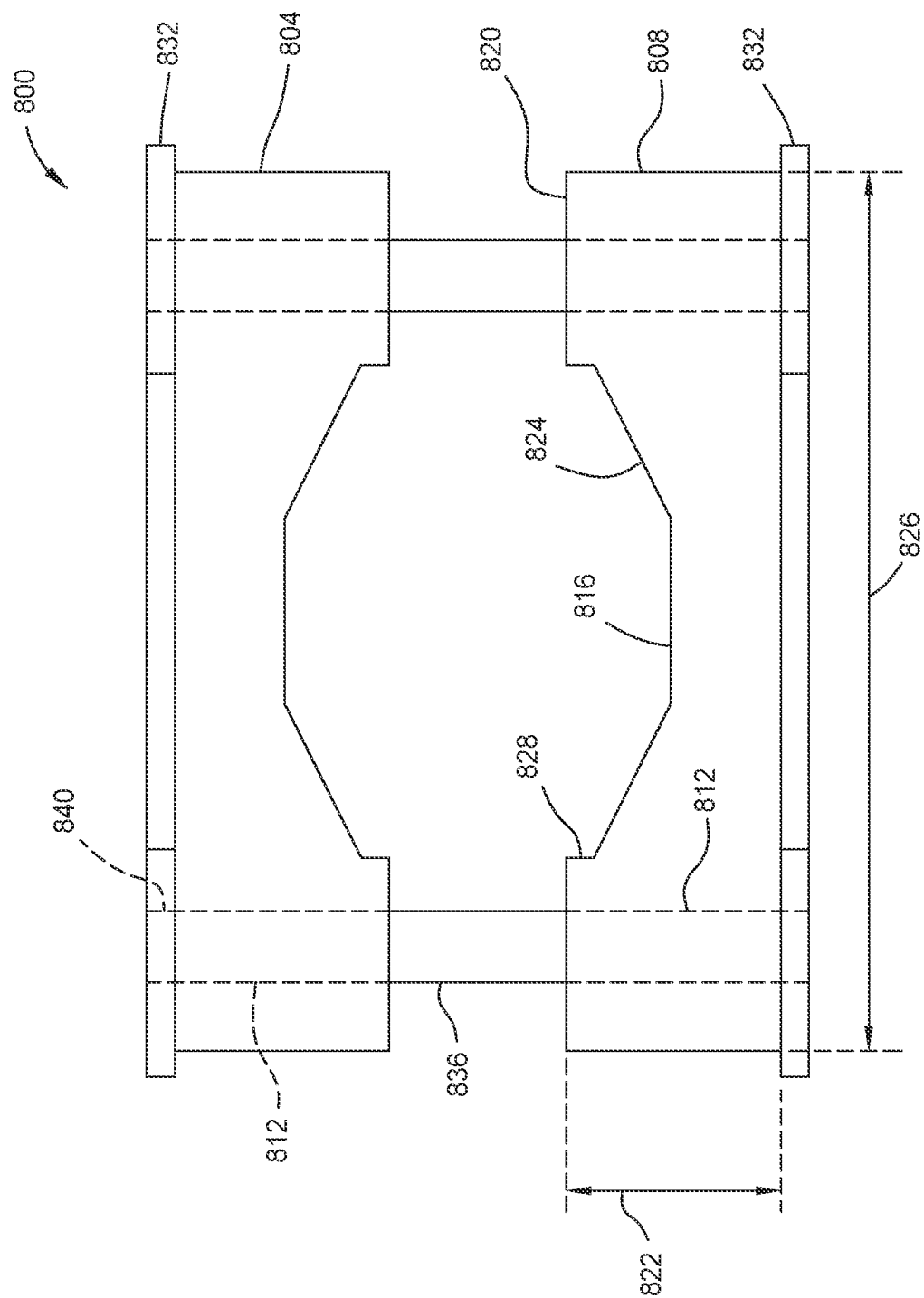
FIG. 8 is a plan view of an exemplary lamp holding structure suitable to secure the lamp depicted in FIGS. 2A-2B and 3A.

FIG. 8 is a plan view of an exemplary lamp holding structure 800 suitable to secure the lamp 200 depicted in FIGS. 2A, 2B, and 3A. The lamp holding structure 800 has a supporting structure 832, a frame 804 and a base 808. The base 204 of the lamp 200 may be held between the frame 804 and the base 808 of the lamp holding structure 800. The frame 804 and the base 808 are configured to secure the lamp 200 during measuring of certain dimensions, according to the apparatuses and methods disclosed herein. The frame 804 and base 808 are of substantially equal dimensions, having a top surface 820 at either end of the base 808. A recessed surface 816 is disposed in a center of the base 808. Angled surface(s) 824 are disposed between the top surface(s) 820 and the recessed surface 816. The recessed surface 816 is substantially parallel to the top surface(s) 820. A wall 828 is substantially perpendicular to the top surface 820. The angled surface(s) 824 are connected to the top surface(s) 820 by the wall 828. A width 826 of the base 808, measured in a direction that is parallel to the top surface(s) 820, is greater than a height 822 of the base 808. As shown, the height 822 is measured between the supporting structure 832 and the top surface 820 in a direction substantially perpendicular to the top surface(s) 820.

A through-hole 812 extends through the top surface(s) 820 of the base 808, and aligns with another through-hole 812 in the top surface 820 of the frame 804. In some examples, the lamp holding structure 800 is augmented with the supporting structure 832. The through-hole 840 in the supporting structure 832 substantially aligns with the through-hole 812 in the frame 804, and the through-hole 812 in the base 808. A fastener 836 passes through the through-hole 840 in the supporting structure 832. The fastener 836 passes through the through-hole 812 in the frame 804 and the through-hole 812 in the base 808. In one configuration of the lamp holding structure 800, the fastener 836 only passes through the through-hole 812 in the frame 804 and the through-hole 812 in the base 808. The fastener 836 is configured to secure the frame 804 to the base 808. When the supporting structure 832 is utilized, the fastener 836 secures the frame 804, base 808, and supporting structure 832 to one another. The fasteners 836 may be bolts, pins, welded rods, threaded screws, or any other suitable connection device. It should be appreciated that the lamp holding structure 800 may have more than one through holes similar to through-hole 812 and fasteners for balancing the clamping forces on the lamp. The lamp holding structure 800 may be made from any one of or combination of plastic, metals, such as aluminum and steel, quartz, or wood.

Figure 9:
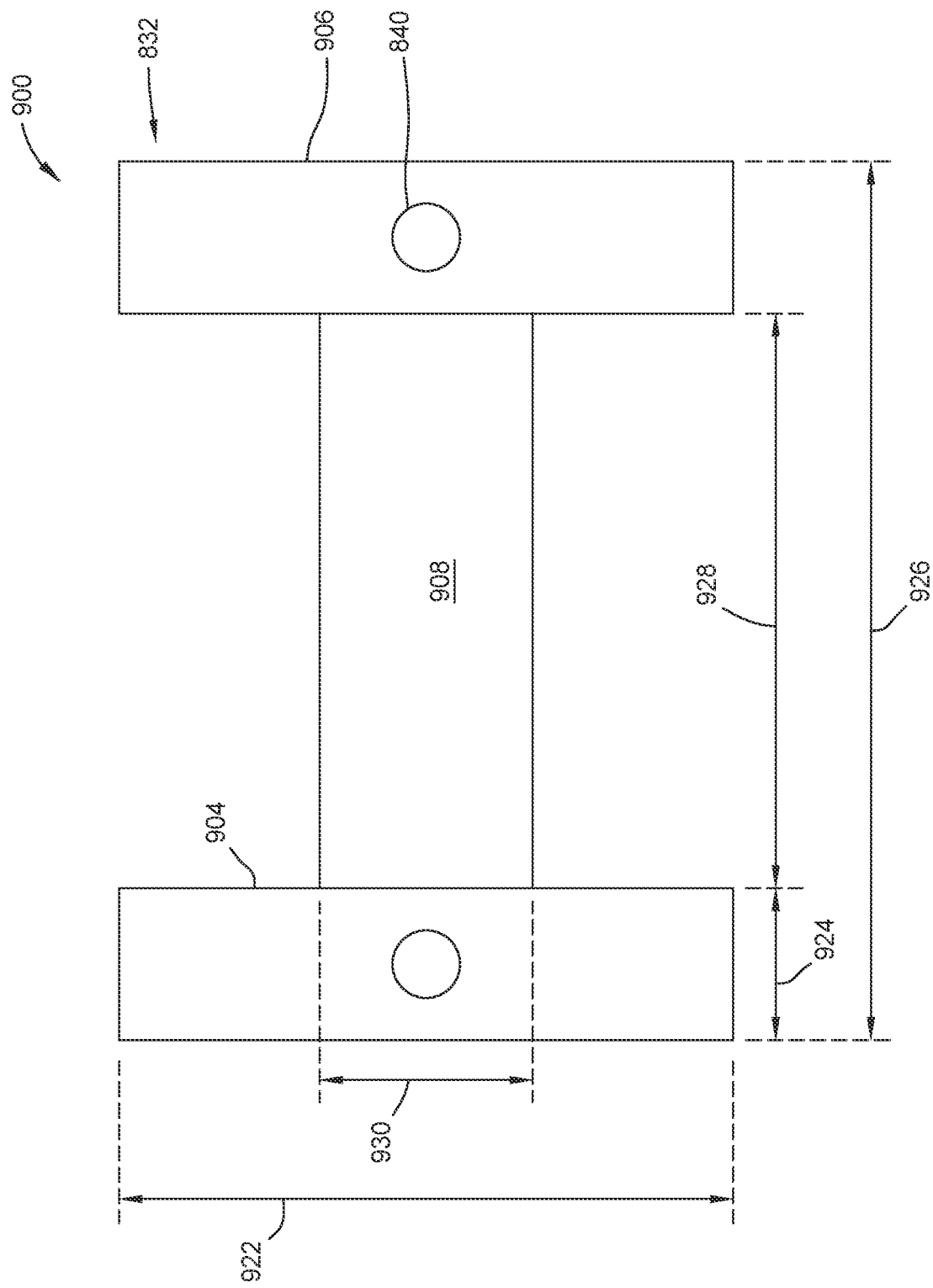
FIG. 9 is a top plan view of an exemplary supporting structure that can support the lamp holding structure in FIG. 8.

FIG. 9 is a top plan view of the exemplary supporting structure 832 used to support the lamp holding structure 800 in FIG. 8. The supporting structure 832 has a first leg 904 and a second leg 906 that are connected by a linking member 908. The first leg 904 and second leg 906 are substantially parallel to one another. The linking member 908 is substantially perpendicular to the first leg 904 and the second leg 906.

Each of the first leg 904 and the second leg 906 has a length 922 that is longer than a width 924. The linking member 908 expands a distance 928 between the first leg 904 and second leg 906. The linking member 908 has a thickness 930. A total width 926 of supporting structure 832 is equal to the width of the first leg 904, the width 924 of the second leg 906, and the distance 928 between the first leg 904 and second leg 906.

Figure 10:
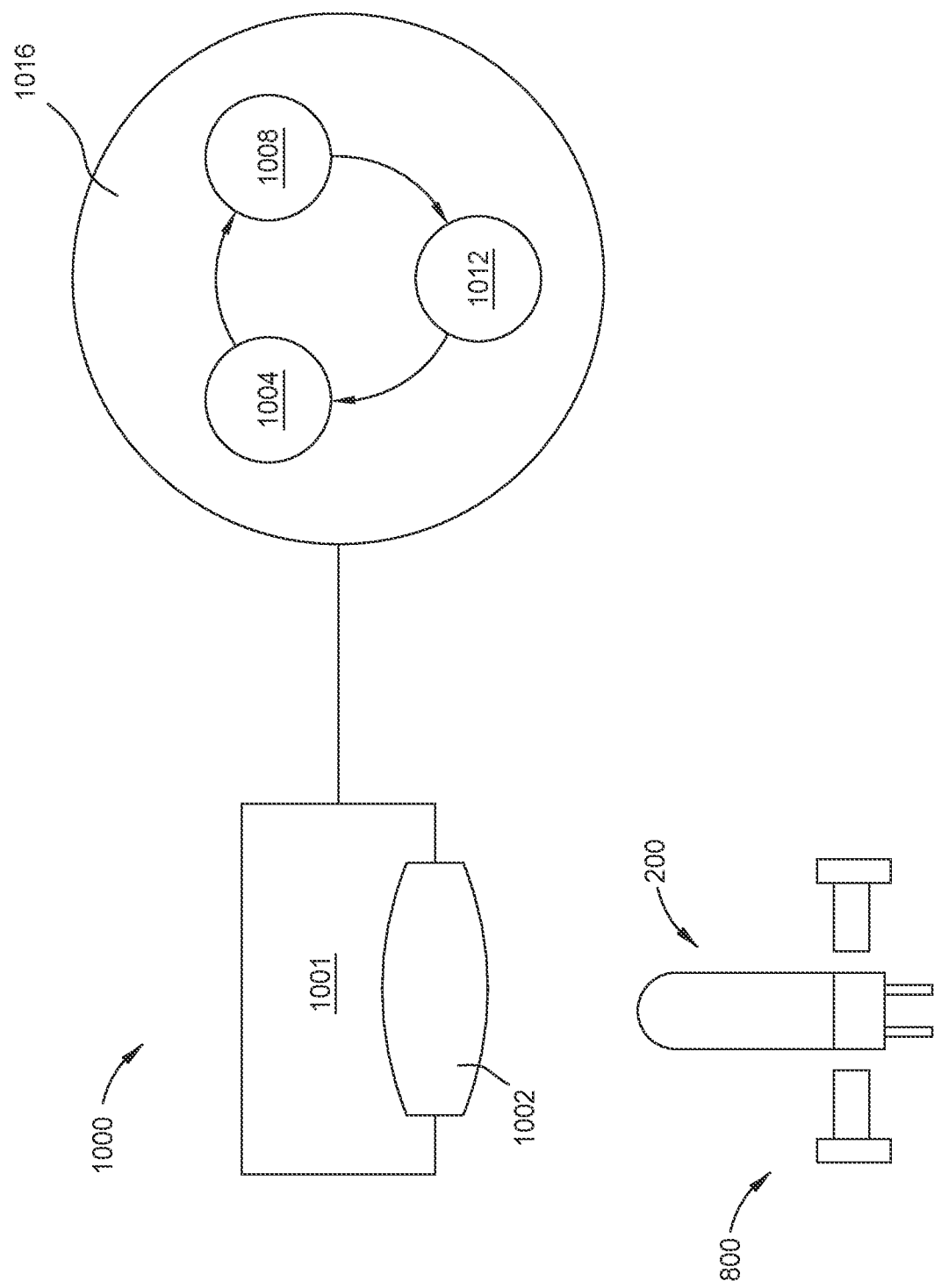
FIG. 10 is a schematic block diagram of an image processing device configured to inspect a lamp.

FIG. 10 is a plan view of the image processing apparatus 1000 used to measure dimensions of the lamp 200 depicted in FIGS. 2A-2B and 3A. The lamp holding structure 800 can be used to position the lamp in the field of view of a camera and lens. Positioning the lamp within the field of view of the camera and lens enables an image of the lamp to be taken. A controller 1016 process the actual measurements of the lamp from the image taken by the camera and the lens.

The image processing apparatus 1000 includes a camera 1001 coupled to the controller 1016. The controller 1016 includes a processor 1004, a memory 1008, and support circuits 1012 that are coupled to one another. The controller 1016 may be on-board the camera 1001, or in an alternative example, the controller 1016 may be on-board a remote device (not shown) that receives images from the camera 1001. The camera 1001 has at least one lens 1002 that is configured to capture images of the lamp 200, disclosed herein.

The image processing apparatus 1000 includes an input control unit, such as power supplies, clocks, cache, input/output (I/O) circuits, coupled to the various components of the image processing apparatus 1000 to facilitate control thereof. Optionally, the image processing apparatus 1000 can include a display unit (not shown). The processor 1004 may be one of any form of general purpose microprocessor, or a general purpose central processing unit (CPU), each of which can be used in an industrial setting, such as a programmable logic controller (PLC).

The memory 1008 is non-transitory and may be one or more of readily available memory such as random access memory (RAM), read only memory (ROM), or any other form of digital storage, local or remote. The memory 1008 contains instructions, that when executed by the processor 1004, facilitates the operation of the image processing apparatus 1000. The instructions in the memory 1008 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure.

In one example, the disclosure may be implemented as the program product stored on a computer-readable storage media (e.g., 1008) for use with a computer system (not shown). The program(s) of the program product define functions of the disclosure, described herein. The programs/instructions includes image processing algorithms that are configured to detect the edges of images of the lamp 200 (shown in FIGS. 2-3) acquired by the lens 1002. These algorithms include, but are not limited to, Canny edge detection, Gaussian filters, Gradient magnitude filters, Hough transforms, hysteresis thresholding, Roberts operator, Sobel operator, Pewitt operator, Laplacian operator, first and second order derivatives, as well as other edge detection techniques that use any one of or a combination of these techniques, including those not explicitly mentioned above.

Figure 11:
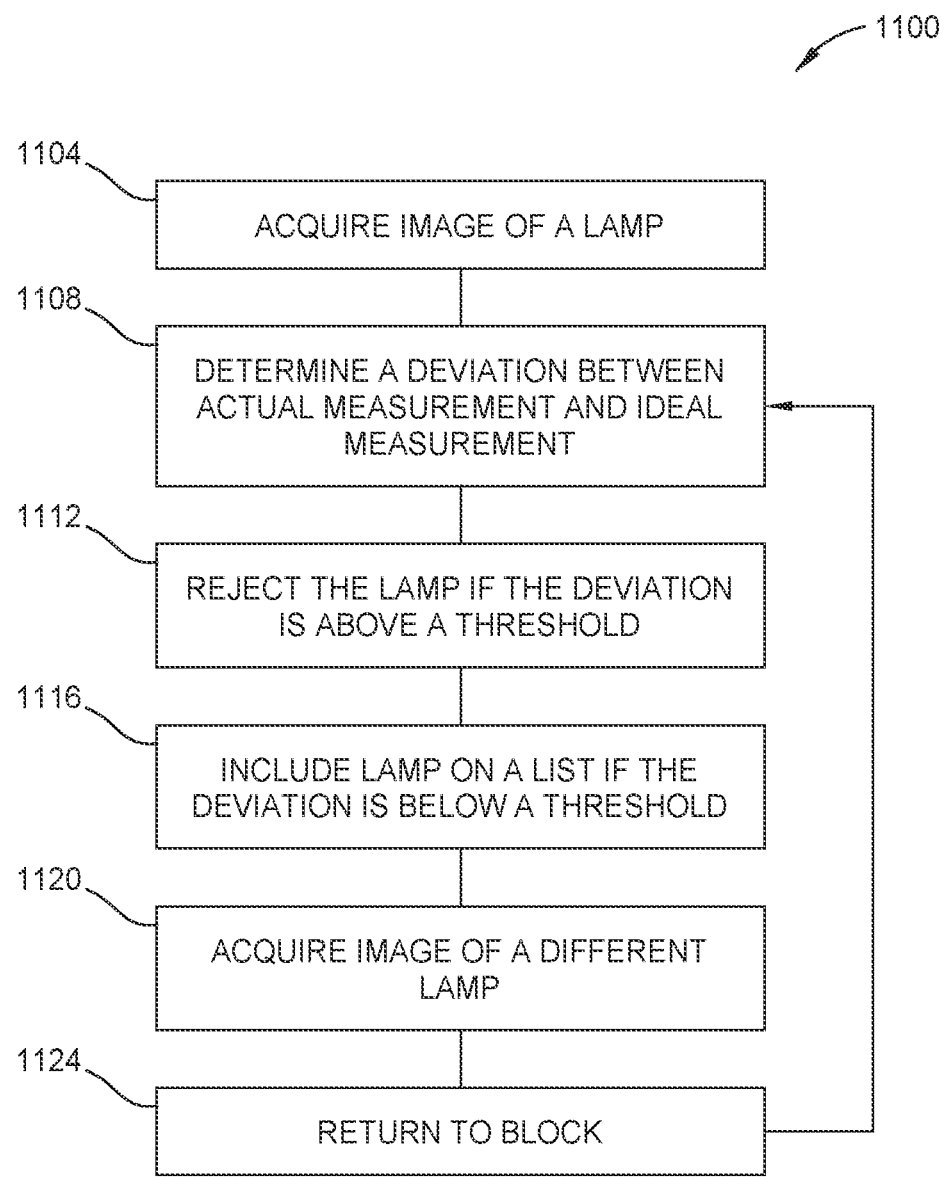
FIG. 11 is a flow chart of an exemplary method for inspecting a lamp utilizing the image processing device of FIG. 10.

FIG. 11 is a flow chart of an exemplary method 1100 for inspecting a lamp the utilizing the image processing device of FIG. 10. The method 1100 can be stored on the memory 1008. At block 1104 an image of the lamp 200 is acquired. A deviation between actual measurements and ideal measurements of the lamp 200 are determined at block 1108. The actual measurements can be acquired by the image processing apparatus 1000 disclosed above. In another example, the image processing apparatus 1000 can receive the actual measurements from a measuring apparatus (not shown). The ideal measurements can be stored in memory 1008 and compared against the actual measurements by programs installed in the memory 1008 of the controller 1016. The measurements include, but are not limited to the following parameters: the outer diameter 264 of the filament, the first deviation angle 268 of the filament 248, first length 272 of the lamp 200, second length 276 of the lamp 200, the length 304 of filament 248, the vertical distance 308 of filament 248, and the second deviation angle 312. It is understood that additional measurements, including those disclosed above, can be ascertained. As illustrated in FIGS. 2C and 3B, the method 1100 generates a window, i.e., a first coil box 320 or a second coil box 370, in order to determine the noted parameters. It is further understood that the method 1100 includes processes to enable each feature in FIGS. 2C and 3B to be realized. At block 1112, the lamp 200 is rejected if the deviation is above a threshold. Stated differently, the lamp 200 may be flagged or identified by the image processing apparatus 1000 as rejected if any one of the above-mentioned parameters does not conform to the ideal measurement by more than the permitted threshold. The parameters are measured (i.e., determined) dimensions or magnitudes of the lamp 200. If the deviation of the lamp 200 is less than or equal the threshold, the lamp 200 is flagged as conforming and may be included on a list of conforming lamps at block 1116. At block 1120 an image of a different lamp 200 is acquired, and at step 1124, the method 1100 returns to block 1108. Blocks 1108-1124 are repeated until no new images are acquired, or the method 1100 is interrupted by a user. Lamp(s) 200 that are not rejected (i.e., conforming) may be separated from those lamps 200 that are rejected (i.e., non-conforming).

Disclosed above is a method and apparatus for measuring and testing lamp dimensions for three-dimensionally printed lamp filaments. While the foregoing is directed to specific examples, other examples may be devised without departing from the basic scope thereof, and the scope thereof is determined by the claims that follow.

What we claim is:
1. A lamp, comprising:
  a bulb filled with a gas;
  a filament disposed within the bulb, the filament comprising a plurality of coils, the plurality of coils comprising:
    a first coil having a first point,
    a second coil having a second point, and
    a third coil having a third point, the first, second, and third points forming a pitch gradient, the pitch gradient defined by:
      a first pitch between the second point and the first point,
      a second pitch between the third point and the second point, the second point is 360 degrees away from the first point, and the third point is 360 degrees away from the second point, and a difference between a magnitude of the first pitch and a magnitude of the second pitch, wherein the second pitch is greater than the first pitch.

2. The lamp of claim 1, the plurality of coils further comprising:
a fourth coil having a fourth point, wherein a third pitch is between the third point and the fourth point, and the fourth point is 360 degrees away from the third point.

3. The lamp of claim 2, the plurality of coils further comprising:
a fifth coil having a fifth point, wherein a fourth pitch is between the fourth point and the fifth point, and the fifth point is 360 degrees away from the fourth point.

4. The lamp of claim 3, wherein the pitch gradient is further defined by a difference between a magnitude of the second pitch and a magnitude of the third pitch, and a difference between a magnitude of the third pitch and a magnitude of the fourth pitch, the third pitch is greater than the second pitch, and the fourth pitch is greater than the third pitch.

5. The lamp of claim 2, wherein the pitch gradient increases between about 2 percent and about 6 percent between successive pitches that include the first pitch, the second pitch, and the third pitch.

6. The lamp of claim 1, further comprising:
electrodes electrically coupled to the filament; and
a pair of pins electrically coupled to the electrodes, the pair of pins configured to transfer energy to the filament.

7. The lamp of claim 1, wherein the lamp has a length that is between about 120 mm and about 135 mm.

8. The lamp of claim 1, wherein the pitch gradient increments by a successive pitch, the successive pitch defined by: $P_n = P_0 + (n*s)$, where n is a number of a given pitch in a given set of pitches, $P_0$ is the first pitch, and s is a step, the step being a positive real number.

9. The lamp of claim 1, wherein the filament has a cross-section that is polygonal in shape.

10. A processing chamber comprising:
a lamp configured to provide heat to an internal volume of the processing chamber, the lamp comprising:
a bulb filled with a gas;
a filament disposed within the bulb, the filament comprising a plurality of coils, the plurality of coils comprising:
a first coil having a first point,
a second coil having a second point, and
a third coil having a third point, the first, second, and third points forming a pitch gradient, the pitch gradient defined by:
a first pitch between the second point and the first point,
a second pitch between the third point and the second point, the second point is 360 degrees away from the first point, and the third point is 360 degrees away from the second point, and
a difference between a magnitude of the first pitch and a magnitude of the second pitch, wherein the second pitch is greater than the first pitch.

11. The processing chamber of claim 10, the plurality of coils further comprising:
a fourth coil having a fourth point, a third pitch is between the third point and the fourth point, and the fourth point is 360 degrees away from the third point.

12. The processing chamber of claim 11, the plurality of coils further comprising:
a fifth coil having a fifth point, a fourth pitch is between the fourth point and the fifth point, and the fifth point is 360 degrees away from the fourth point.

13. The processing chamber of claim 12, wherein the pitch gradient is further defined by a difference between a magnitude of the second pitch and a magnitude of the third pitch, and a difference between a magnitude of the third pitch and a magnitude of the fourth pitch, the third pitch is greater than the second pitch, and the fourth pitch is greater than the third pitch.

14. The processing chamber of claim 11, wherein the pitch gradient increases between about 2 percent and about 6 percent between successive pitches that include the first pitch, the second pitch, and the third pitch.

15. The processing chamber of claim 10, further comprising:
electrodes electrically coupled to the filament; and
a pair of pins electrically coupled to the electrodes, the pair of pins configured to transfer energy to the filament.

16. A method of fabricating a filament for a lamp, the method comprising:
forming a filament for disposing in a dome filled with a gas, the filament comprising a plurality of coils, the plurality of coils comprising:
a first coil having a first point,
a second coil having a second point, and
a third coil having a third point, the first, second, and third points forming a pitch gradient, the pitch gradient defined by:
a first pitch between the second point and the first point,
a second pitch between the third point and the second point, the second point is 360 degrees away from the first point, and the third point is 360 degrees away from the second point, and
a difference between a magnitude of the first pitch and a magnitude of the second pitch, wherein the second pitch is greater than the first pitch.

17. The method of claim 16, wherein the forming of the filament includes one or more of additive manufacturing, extrusion, or three-dimensional (3-D) printing.

18. A lamp, comprising:
a bulb filled with a gas;
a filament disposed within the bulb, the filament comprising a plurality of coils, the plurality of coils comprising:
a first coil having a first point,
a second coil having a second point,
a third coil having a third point, and
a fourth coil having a fourth point, the first, second, third, and fourth points forming a pitch gradient, the pitch gradient defined by:
a first pitch between the second point and the first point,
a second pitch between the third point and the second point, wherein the second pitch is greater than the first pitch, the second point is 360 degrees away from the first point, and the third point is 360 degrees away from the second point,
a third pitch between the third point and the fourth point, and the fourth point is 360 degrees away from the third point, and a difference between a magnitude of the second pitch and a magnitude of the third pitch, wherein the third pitch is greater than the second pitch.

19. The lamp of claim 18, the plurality of coils further comprising:
a fifth coil having a fifth point, wherein a fourth pitch is between the fourth point and the fifth point, and the fifth point is 360 degrees away from the fourth point.

20. The lamp of claim 19, wherein the pitch gradient is further defined by a difference between a magnitude of the third pitch and a magnitude of the fourth pitch, wherein the fourth pitch is greater than the third pitch.

21. A lamp, comprising:
a bulb filled with a gas;
a filament disposed within the bulb, the filament comprising a plurality of coils, the plurality of coils comprising:
a first coil having a first point,
a second coil having a second point, and
a third coil having a third point, the first, second, and third points forming a pitch gradient, the pitch gradient defined by:
a first pitch between the second point and the first point, and
a second pitch between the third point and the second point, wherein the second pitch is greater than the first pitch, the second point is 360 degrees away from the first point, and the third point is 360 degrees away from the second point,
wherein the pitch gradient increases between about 2 percent and about 6 percent between successive pitches that include the first pitch and the second pitch.

22. The lamp of claim 21, the plurality of coils further comprising:
a fourth coil having a fourth point, wherein a third pitch between the third point and the fourth point is greater than the second pitch, and the fourth point is 360 degrees away from the third point.

23. The lamp of claim 22, wherein the successive pitches further include the third pitch.

24. A lamp, comprising:
a bulb filled with a gas;
a filament disposed within the bulb, the filament comprising a plurality of coils, the plurality of coils comprising:
a first coil having a first point,
a second coil having a second point, and
a third coil having a third point, the first, second, and third points forming a pitch gradient, the pitch gradient defined by:
a first pitch between the second point and the first point, and
a second pitch between the third point and the second point, wherein the second pitch is greater than the first pitch, the second point is 360 degrees away from the first point, and the third point is 360 degrees away from the second point,
wherein the pitch gradient increments by a successive pitch, the successive pitch defined by: $P_n = P_0 + (n*s)$, where n is a number of a given pitch in a given set of pitches, $P_0$ is the first pitch, and s is a step, the step being a positive real number.

25. A processing chamber comprising:
a lamp configured to provide heat to an internal volume of the processing chamber, the lamp comprising:
a bulb filled with a gas;
a filament disposed within the bulb, the filament comprising a plurality of coils, the plurality of coils comprising:
a first coil having a first point,
a second coil having a second point,
a third coil having a third point, and
a fourth coil having a fourth point, the first, second, third, and fourth points forming a pitch gradient, the pitch gradient defined by:
a first pitch between the second point and the first point,
a second pitch between the third point and the second point, wherein the second pitch is greater than the first pitch, the second point is 360 degrees away from the first point, and the third point is 360 degrees away from the second point,
a third pitch between the third point and the fourth point, the fourth point is 360 degrees away from the third point, and
a difference between a magnitude of the second pitch and a magnitude of the third pitch, the third pitch is greater than the second pitch.

26. The processing chamber of claim 25, the plurality of coils further comprising:
a fifth coil having a fifth point, a fourth pitch is between the fourth point and the fifth point, and the fifth point is 360 degrees away from the fourth point.

27. The processing chamber of claim 26, wherein the pitch gradient is further defined by a difference between a magnitude of the third pitch and a magnitude of the fourth pitch, the fourth pitch is greater than the third pitch.

28. A processing chamber comprising:
a lamp configured to provide heat to an internal volume of the processing chamber, the lamp comprising:
a bulb filled with a gas;
a filament disposed within the bulb, the filament comprising a plurality of coils, the plurality of coils comprising:
a first coil having a first point,
a second coil having a second point, and
a third coil having a third point, the first, second, and third points forming a pitch gradient, the pitch gradient defined by:
a first pitch between the second point and the first point,
a second pitch between the third point and the second point, wherein the second pitch is greater than the first pitch, the second point is 360 degrees away from the first point, and the third point is 360 degrees away from the second point,
wherein the pitch gradient increases between about 2 percent and about 6 percent between successive pitches that include the first pitch and the second pitch.

29. The processing chamber of claim 28, the plurality of coils further comprising:
a fourth coil having a fourth point, a third pitch between the third point and the fourth point is greater than the second pitch, and the fourth point is 360 degrees away from the third point.

30. The processing chamber of claim 29, wherein the successive pitches further include the third pitch.

* * * * *